(12) United States Patent
Yun et al.

(10) Patent No.: US 11,500,533 B2
(45) Date of Patent: Nov. 15, 2022

(54) MOBILE TERMINAL FOR DISPLAYING A PREVIEW IMAGE TO BE CAPTURED BY A CAMERA AND CONTROL METHOD THEREFOR

(71) Applicant: LG ELECTRONICS INC., Seoul (KR)

(72) Inventors: Jiwon Yun, Seoul (KR); Pilseok Kang, Seoul (KR); Changmok Kim, Seoul (KR); Hyerim Ku, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/970,317

(22) PCT Filed: May 2, 2018

(86) PCT No.: PCT/KR2018/005084
§ 371 (c)(1),
(2) Date: Aug. 14, 2020

(87) PCT Pub. No.: WO2019/160194
PCT Pub. Date: Aug. 22, 2019

(65) Prior Publication Data
US 2021/0081093 A1 Mar. 18, 2021

Related U.S. Application Data

(60) Provisional application No. 62/630,274, filed on Feb. 14, 2018.

(51) Int. Cl.
*H04N 1/00* (2006.01)
*G06F 3/0488* (2022.01)
(Continued)

(52) U.S. Cl.
CPC .......... *G06F 3/0488* (2013.01); *G06F 3/0482* (2013.01); *H04M 1/725* (2013.01);
(Continued)

(58) Field of Classification Search
None
See application file for complete search history.

(56) References Cited

U.S. PATENT DOCUMENTS 9,824,397 B1* 11/2017 Patel ....................... G06Q 40/08
2010/0173678 A1* 7/2010 Kim ................ H04N 5/232935
455/566

(Continued)

FOREIGN PATENT DOCUMENTS

| CN | 105323456 | 2/2016 |
| EP | 3382632 | 10/2018 |

(Continued)

OTHER PUBLICATIONS

KR20170021038A (Eng Machine Translation) publihsed on Feb. 27, 2017.*

(Continued)

*Primary Examiner* — Rinna Yi
(74) *Attorney, Agent, or Firm* — Lee, Hong, Degerman, Kang & Waimey PC

(57) ABSTRACT

Disclosed are a mobile terminal and a control method therefor. The mobile terminal according to one embodiment of the present invention comprises: a camera provided to a main body; a display unit for displaying a preview image for the photographing of the camera; and a control unit for detecting the entering into of a subject recognition mode while the preview image is being displayed, and in the subject recognition mode, analyzing objects included in the preview image so as to recognize a subject to be photographed, and applying, to the preview image, a camera effect
(Continued)

matched with the recognized subject. In addition, while the matched camera effect is being applied to the preview image, the control unit may further provide, on the display unit, on the basis of a touch input applied to the preview image, a list of camera effects additionally applicable to the recognized subject.

14 Claims, 22 Drawing Sheets

(51) Int. Cl.
*H04M 1/725* (2021.01)
*H04N 5/232* (2006.01)
*G06F 3/0482* (2013.01)

(52) U.S. Cl.
CPC ..... *H04N 1/00461* (2013.01); *H04N 5/23293* (2013.01); *H04N 5/232935* (2018.08)

(56) References Cited

U.S. PATENT DOCUMENTS

| | | | | |
|---|---|---|---|---|
| 2010/0313113 | A1* | 12/2010 | Chen | G06T 19/006 |
| | | | | 715/230 |
| 2011/0043662 | A1* | 2/2011 | Kim | G03B 17/00 |
| | | | | 348/240.2 |
| 2011/0164163 | A1 | 7/2011 | Bilbrey et al. | |
| 2012/0062593 | A1* | 3/2012 | Kojima | G06F 3/0488 |
| | | | | 345/629 |
| 2012/0223966 | A1 | 9/2012 | Lim | |
| 2014/0240101 | A1* | 8/2014 | Uno | G06F 16/9566 |
| | | | | 340/10.51 |
| 2015/0302246 | A1* | 10/2015 | Kapinos | G06K 9/00671 |
| | | | | 348/61 |
| 2015/0325023 | A1* | 11/2015 | Gross | G06K 9/00221 |
| | | | | 382/203 |
| 2016/0048287 | A1 | 2/2016 | Lee et al. | |
| 2016/0073034 | A1 | 3/2016 | Mukherjee et al. | |
| 2016/0198100 | A1 | 7/2016 | Cho et al. | |
| 2017/0085809 | A1* | 3/2017 | Lee | H04N 9/07 |
| 2019/0124272 | A1* | 4/2019 | O'Neill | H04N 5/23222 |

FOREIGN PATENT DOCUMENTS

| | | |
|---|---|---|
| KR | 1020130139126 | 12/2013 |
| KR | 1020150082841 | 7/2015 |
| KR | 20170020069 | 2/2017 |
| KR | 20170021038 | 2/2017 |
| KR | 1020140142523 | 2/2017 |
| KR | 1020170011321 | 2/2017 |
| KR | 1020170014722 | 2/2017 |
| KR | 1020170016215 | 2/2017 |
| KR | 20170029978 | 3/2017 |
| KR | 101781773 | 9/2017 |
| KR | 101822655 | 1/2018 |
| WO | 2016013915 | 1/2016 |

OTHER PUBLICATIONS

PCT International Application No. PCT/KR2018/005084, International Search Report dated Nov. 14, 2018, 4 pages.
European Patent Office Application Serial No. 18906506.3, Search Report dated Oct. 14, 2021, 17 pages.
European Patent Office Application Serial No. 18906418.1, Search Report dated Nov. 24, 2021, 13 pages.
PCT International Application No. PCT/KR2018/005995, International Search Report dated Oct. 31, 2018, 11 pages.
European Patent Office Application Serial No. 18906506.3, Search Report dated Feb. 8, 2022, 40 pages.
European Patent Office Application Serial No. 18906418.1, Search Report dated Mar. 1, 2022, 11 pages.

* cited by examiner (a) (b) (c) (d) (e)

(f) (g) (h) (i) (j)

(k) (l) (m) (n) (o)

(p) (q) (r) (s)

[FAMILIAR PLACE]     [UNFAMILIAR PLACE]

MOBILE TERMINAL FOR DISPLAYING A PREVIEW IMAGE TO BE CAPTURED BY A CAMERA AND CONTROL METHOD THEREFOR

CROSS-REFERENCE TO RELATED APPLICATIONS

This application is the National Stage filing under 35 U.S.C. 371 of International Application No. PCT/KR2018/005084, filed on May 2, 2018, which claims the benefit of U.S. Provisional Application No. 62/630,274, filed on Feb. 14, 2018, the contents of which are all hereby incorporated by reference herein in their entirety.

TECHNICAL FIELD

The present disclosure relates to a mobile terminal having a camera, and a method for controlling the same.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Recently, various camera functions or shooting modes used in a professional camera are provided since there have been a noticeable increase in camera use of a mobile terminal and an improvement in camera pixels. However, it is not only cumbersome for a user to manipulate these functions/options before shooting, but also inconvenient since camera effects or settings need to be changed when a type of a subject to be photographed is changed.

DISCLOSURE

Technical Problem

One aspect of the present disclosure is to provide a mobile terminal capable of obtaining an optimal image result without having to adjust a camera function and a shooting mode suitable for a subject to be photographed and a shooting condition, and a control method therefor.

Another aspect of the present disclosure is to provide a mobile terminal that can identify a main subject to be photographed even when a plurality of objects is included in a scene to be captured by taking various factors into account so as to apply an optimal camera effect, and a control method therefor.

Still another aspect of the present disclosure is to provide a mobile terminal that can quickly add another camera effect or replace an existing (or applied) effect with another effect if desired even after a camera function optimal for a subject to be photographed or an optimal camera mode is applied, and a method therefor.

Technical Solution

Embodiments disclosed herein provide a mobile terminal that may include a camera provided in a main body, a display configured to display a preview image to be captured by the camera, and a controller configured to detect entry into a subject recognition mode while the preview image is displayed, identify a subject to be photographed by analyzing objects included in the preview image in the subject recognition mode, and to apply a camera effect suitable for the recognized subject to the preview image. In addition, while the matched camera effect is applied to the preview image, the controller may further provide the display with a list of camera effects additionally applicable to the recognized subject based on a touch input to the preview image.

In one embodiment, a graphic object indicating the recognized subject may be output to the preview image when the subject to be photographed is identified, and the list may be provided based on a touch input to the graphic object.

In one embodiment, the list may disappear when a touch input is additionally applied to the graphic object, or a preset time has elapsed.

In one embodiment, when an object in the preview image is changed or the preview image is changed, an image of the graphic object may be changed in real time to correspond to a changed subject.

In one embodiment, the controller may generate a tag corresponding to each object included in the preview image, and a subject to be photographed may be identified by using the generated tag.

In one embodiment, the generated tag may appear on the preview image in a text form and disappear, and when a plurality of tags is generated, the tags may be sequentially output to different locations.

In one embodiment, when a plurality of persons is recognized in the subject recognition mode and at least a part of a face of the person is determined to be located at an edge of the display, the controller may control such that a mode is switched to a wide-angle mode after applying a matched camera effect.

In one embodiment, the mobile terminal may further include a memory configured to store a plurality of recognizable subjects and camera effects suitable for the respective subjects in a table form. The controller, in the subject recognition mode, may specify one of the plurality of recognizable subjects stored in the memory by analyzing the objects included in the preview image, so as to apply a matched camera effect in a calling manner.

In one embodiment, the controller may control such that captured images are classified and stored using the generated tag when the camera is operated in the subject recognition mode.

In one embodiment, in the subject recognition mode, the controller may output a focus image to a corresponding object based on a touch input to the object in the preview image, and control the camera to capture a corresponding preview image based on a touch input continuously applied to the displayed focus image.

In one embodiment, the mobile terminal may further include a sensing unit configured to sense changes in movement value of the main body. The controller may specify a main subject to be photographed among the objects included in the preview image by using the changes in movement value of the main body.

In one embodiment, when different camera effects suitable for the recognized subject exist in the subject recognition mode, the controller may selectively apply one of the camera effects using at least one of time information and location information.

In one embodiment, when the recognized subject is determined as a document including a text, the controller may adjust a contrast ratio between the text and background according to an analyzed text attribute so as to be reflected in the preview image.

Embodiments disclosed herein may also provide a method for con trolling a mobile terminal. The method may include: displaying a preview image to be captured by a camera; detecting entry into a subject recognition mode; analyzing objects included in the preview image to identify a subject to be photographed in the subject recognition mode; applying a camera effect suitable for the recognized subject to the preview image; and displaying a list of camera effects additionally applicable to the subject on a screen, based on a touch input to the preview image.

Advantageous Effects

A mobile terminal and a control method therefor according to embodiments disclosed herein may provide one or more of the following benefits. A user may check a result of an optimal image before shooting and obtain an optimal image result without having to adjust a camera function and a shooting mode suitable for a subject to be photographed and a shooting condition.

In addition, even when a plurality objects is included in a scene to be captured, an optimal camera effect may be quickly applied by accurately identifying a main subject to be photographed by taking into account various aspects, such as changes in movement value of a main body, the current time, a current location, and user selection, and the like. Further, even after a shooting mode optimized for the subject is applied, another camera effect desired by the user can be quickly added or alternatively (or newly) applied.

Furthermore, as a subject or scene to be captured is identified based on a tag cloud according to preview image analysis, and images captured are automatically classified and stored based on the tag cloud, the stored images can be easily and quickly retrieved using a tag.

BEST MODE FOR CARRYING OUT EMBODIMENTS

Figure 1A:
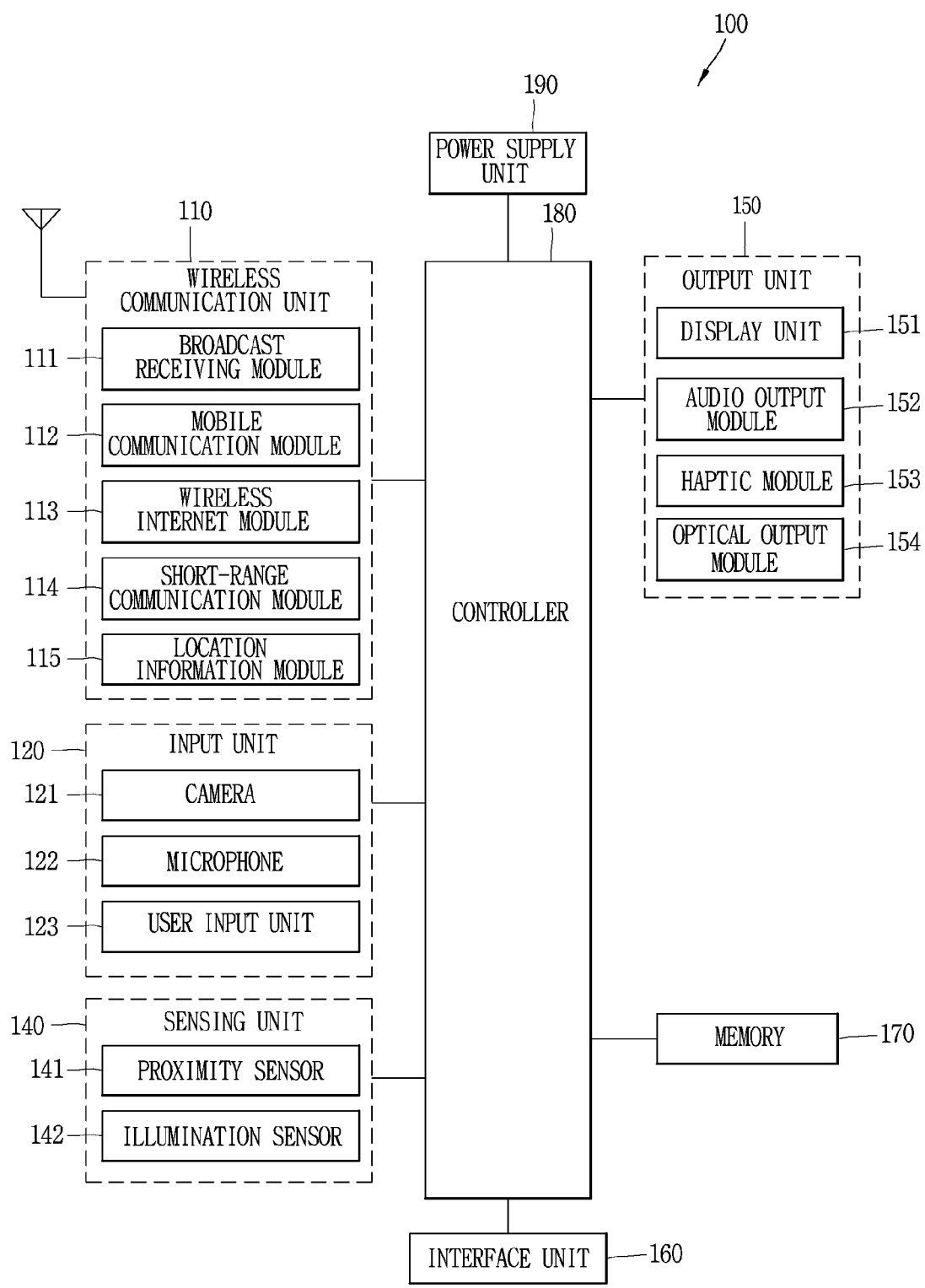
FIG. 1A is a block diagram illustrating a configuration of a mobile terminal in accordance with an embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the main point of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (e.g., smart watches, smart glasses, head mounted displays (HMDs)), and the like.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (e.g., smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1B:
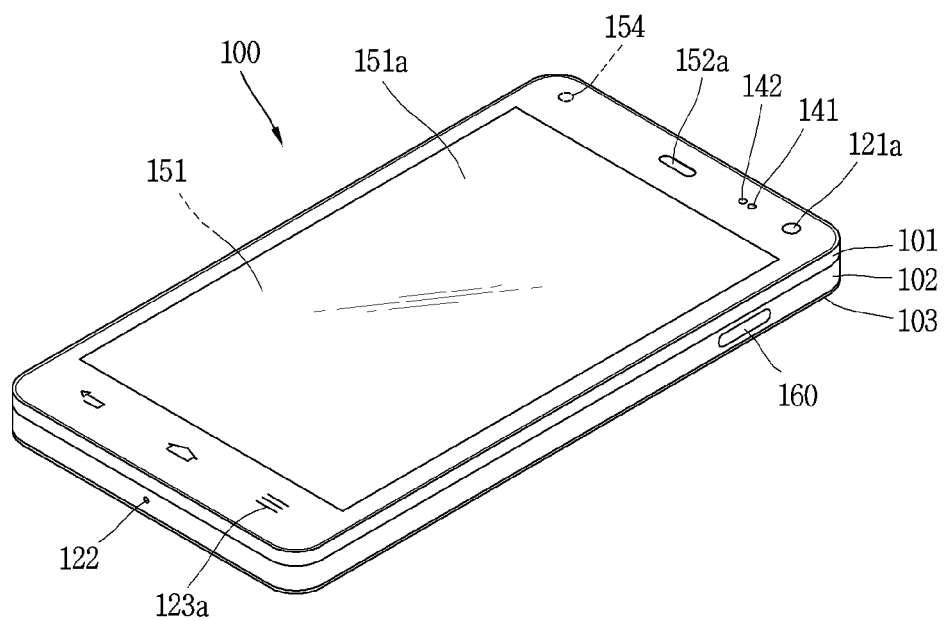
FIGS. 1B and 1O are conceptual diagrams of a mobile terminal according to the present disclosure, viewed from different directions.
Figure 1C:
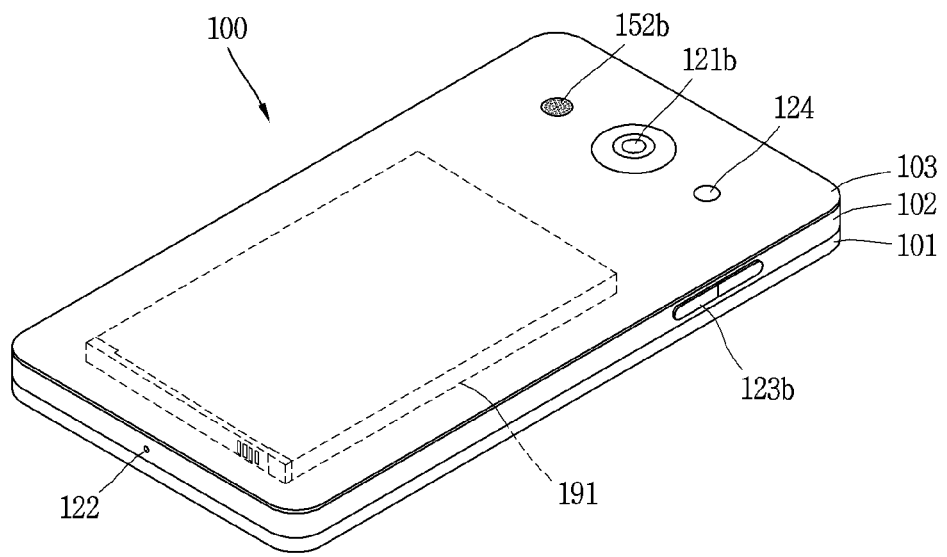
Figure 9A:
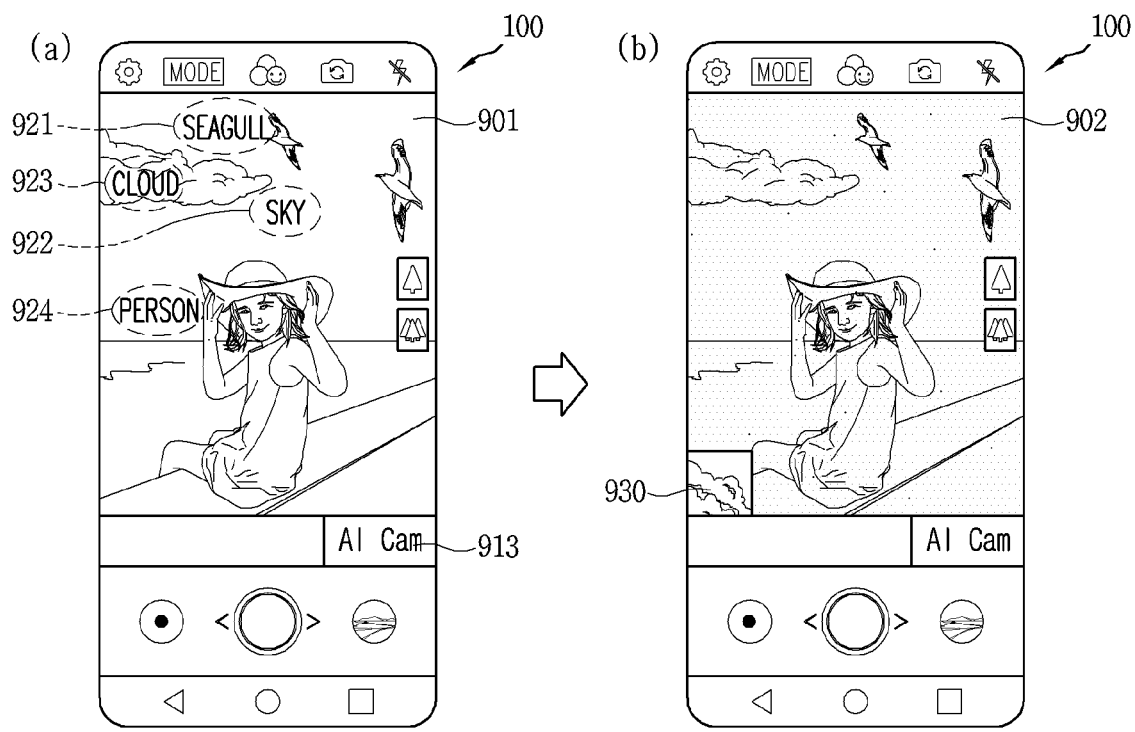
FIGS. 9A, 9B, 9C, and 9D are conceptual diagrams illustrating a method of identifying a main subject to be photographed using at least one of a touch input, changes in movement value, time information, and location information in a mobile terminal according to the present disclosure.
Figure 9B:
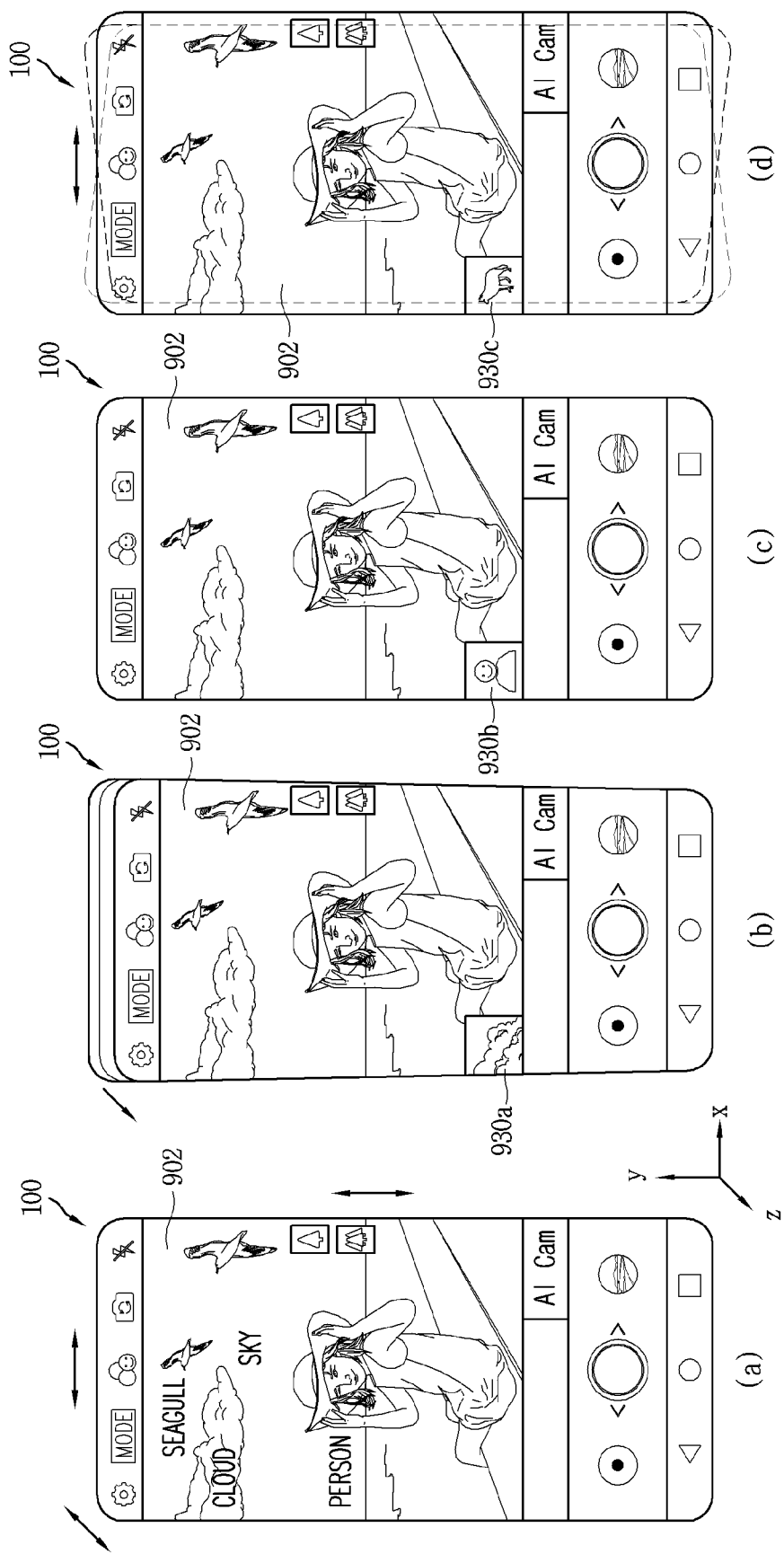
Figure 9C:
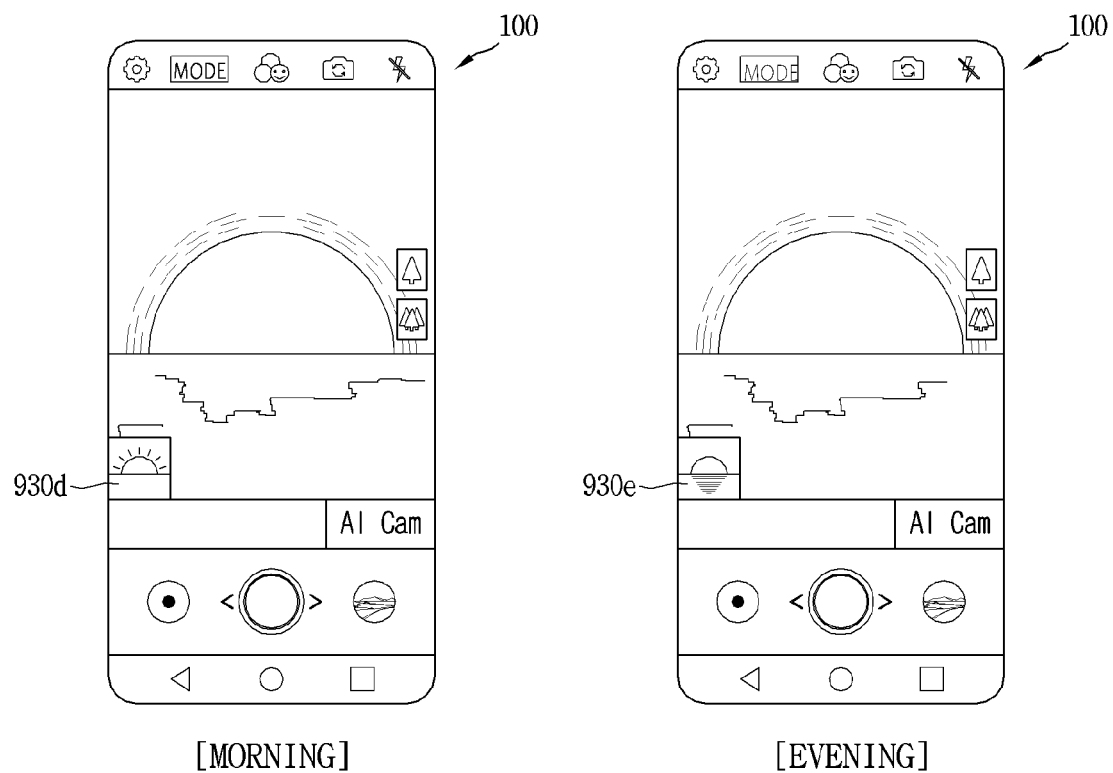
Figure 9D:
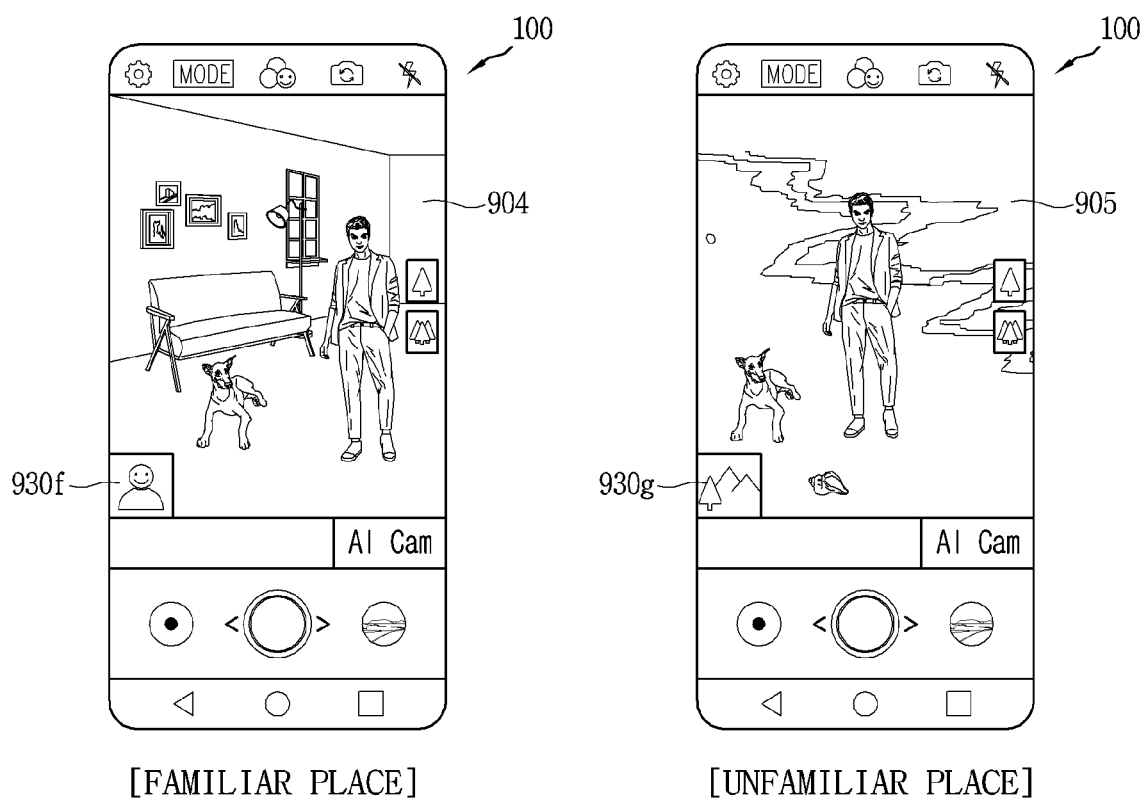
Figure 10:
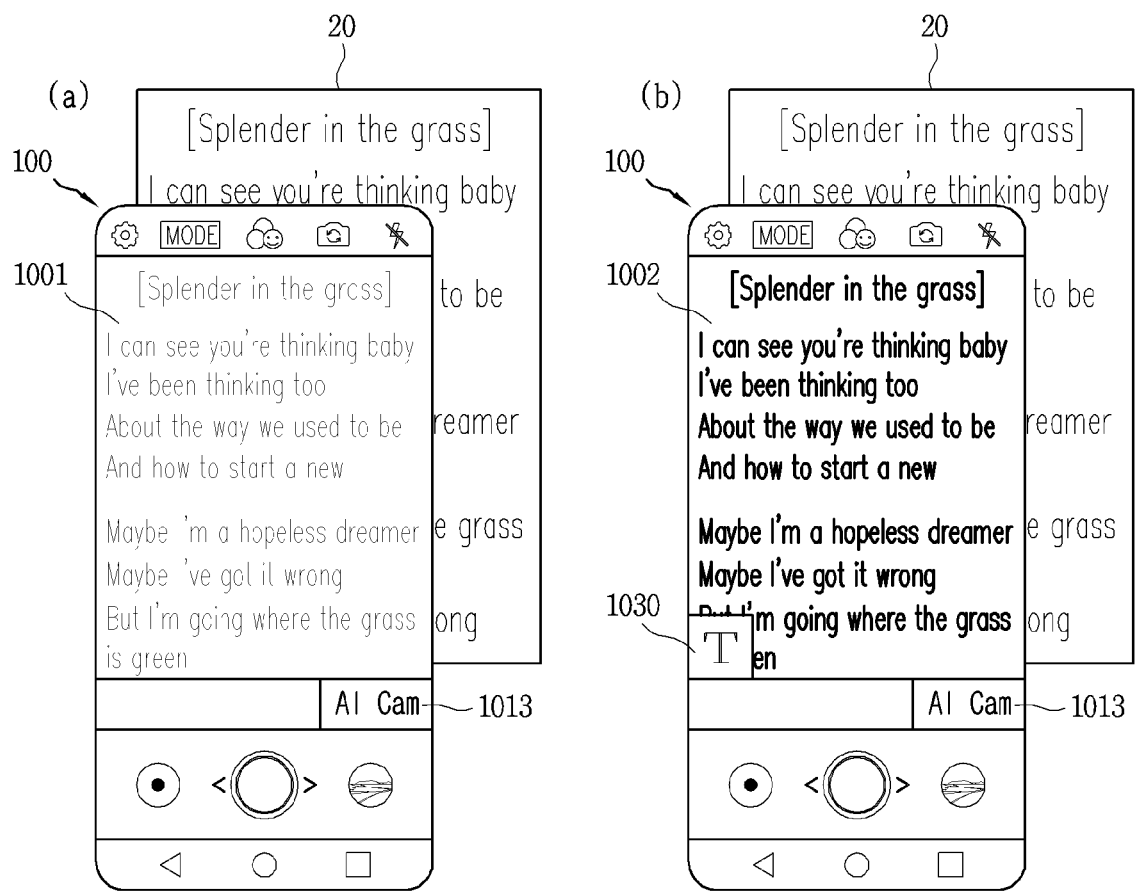
FIG. 10 is a diagram illustrating an exemplary operation in a subject recognition mode when a recognized subject is a document including a text in a mobile terminal according to the present disclosure.

Referring to FIGS. 1A to 10, FIG. 1A is a block diagram of a mobile terminal in accordance with one exemplary embodiment of the present disclosure, and FIGS. 1B and 10 are conceptual views illustrating one example of a mobile terminal, viewed from different directions.

The mobile terminal 100 may include a wireless communication unit 110, an input unit 120, a sensing unit 140, an output unit 150, an interface unit 160, a memory 170, a controller (or control unit) 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules that connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (e.g., a touch key, a mechanical key, and the like) for allowing a user to input information. Data, such as audio and image data, may be obtained by the input unit 120 to be analyzed and processed according to user commands.

The sensing unit 140 may include one or more sensors for sensing at least one of internal information of the mobile terminal, the surrounding environment of the mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (e.g., camera 121), a microphone 122, a battery gauge, an environment sensor (e.g., a barometer, a hygrometer, a thermometer, a radiation detection sensor, a thermal sensor, and a gas sensor, among others), and a chemical sensor (e.g., an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display (or display unit) 151, an audio output module 152, a haptic module 153, and an optical output module 154. The display 151 may have an inter-layered structure or an integrated structure with a touch sensor in order to implement a touch screen. The touch screen may function as the user input unit 123 that provides an input interface between the mobile terminal 100 and a user and simultaneously provide an output interface between the mobile terminal 100 and a user.

The interface unit 160 serves as an interface with various types of external devices that are coupled to the mobile terminal 100. The interface unit 160, for example, may include any of wired or wireless headset ports, external power charging ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (e.g., receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some implementations, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (e.g., Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A), and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, smart glasses, and a head mounted display (HMD), which is able to exchange data with the mobile terminal 100 (or otherwise cooperate with the mobile terminal 100). The short-range communication module 114 may sense or recognize the wearable device, and permit communications between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Next, the input unit 120 is for inputting image information (or signal), audio information (or signal), data, or information input from a user. To enable input of image information, the mobile terminal 100 may be provided with one or more of the cameras 121. Such cameras 121 may process image frames of still pictures or video obtained by image sensors in a video or image capture mode. The processed image frames may be displayed on the display 151 or stored in memory 170. Meanwhile, the cameras 121 provided in the mobile terminal 100 may be arranged in a matrix configuration to allow a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data may be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (e.g., a mechanical key, a button located on a front and/or a rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal 100, surrounding environment information of the mobile terminal 100, user information, or the like, and generate a corresponding sensing signal. The controller 180 may cooperate with the sending unit 140 to control operations of the mobile terminal 100 or to execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area (or region) of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (e.g., a distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 may control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display 151) using any of a variety of touch methods. Examples of such touch methods include a resistive type, a capacitive type, an infrared type, and a magnetic field type, among others.

As one example, the touch sensor may be configured to convert changes of pressure applied to a specific part (or portion) of the display 151, or convert capacitance occurring at a specific part of the touch screen, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display 151 has been touched. Here, the touch controller may be a component separate from the controller 180, or the controller 180 itself.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information related to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one of a camera sensor (CCD, CMOS etc.), a photo sensor (or image sensor), and a laser sensor.

Implementing the camera 121 with a laser sensor may allow detection of a touch of a physical object with respect to a 3D stereoscopic image. The photo sensor may be stacked on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal that changes according to the quantity of applied light. Namely, the photo sensor may calculate the coordinates of the physical object according to variation of light to thus obtain location information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

In some implementations, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 may receive data transmitted from an external device, receive power to transfer to elements and components within the mobile terminal 100, or transmit internal data of the mobile terminal 100 to such external device. The interface unit 160 may include wired or wireless headset ports, external power charging ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (hereinafter, "identifying device") may take the form of a smart card. Accordingly, the identifying device may be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs to support operations of the controller 180 and store input/output data (e.g., phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a web storage that performs the storage function of the memory 170 over a network, such as the Internet.

The controller 180 may typically control operations related to application programs and the general operations of the mobile terminal 100. For example, the controller 180 may set or release a lock state for restricting a user from inputting a control command with respect to applications when a status of the mobile terminal meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 receives external power or provides internal power and supply the appropriate power required for operating respective elements and components included in the portable electronic device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 10, the disclosed mobile terminal 100 includes a bar-like terminal body. However, the mobile terminal 100 may alternatively be implemented in any of a variety of different configurations. Examples of such configurations include a watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 includes a case (e.g., frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally disposed between the front case 101 and the rear case 102.

The display 151 is shown located on the front side of the terminal body to output information. As illustrated, a window 151a of the display 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display (or display unit) 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 10, description will be given of the exemplary mobile terminal 100 in which the front surface of the terminal body is shown having the display 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display 151 may be implemented using two or more display devices, according to the configuration type thereof. For instance, a plurality of the displays 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and the controller 180 may generate a control command corresponding to the touch. Contents input in the touch manner may be characters, numbers, instructions in various modes, or a menu item that can be specified.

The touch sensor may be configured in the form of a film having a touch pattern and disposed between a window 151a and a display (not shown) on a rear surface of the window 151a, or may be a metal wire directly patterned on the rear surface of the window 151a. Alternatively, the touch sensor may be integrally formed with the display. For example, the touch sensor may be disposed on a substrate of the display, or may be provided inside the display.

In this way, the display 151 may define a touch screen together with the touch sensor. Here, the touch screen may function as the user input unit 123 (see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display 151 may include a sound hole for emitting sounds generated from the first audio output module 152a. However, the present disclosure is not limited thereto, and the sounds may be released along an assembly gap between the structural bodies (e.g., a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames may then be displayed on the display 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display 151, or the like.

As another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display 151, or the like. The rear input unit may be implemented into a form allowing a touch input, a push input or a combination thereof.

The rear input unit may be disposed to overlap the display 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display 151 may be implemented to have a larger screen.

Meanwhile, the mobile terminal 100 may include a finger scan sensor that scans a user's fingerprint. The controller may use fingerprint information sensed by the finger scan sensor as part of an authentication procedure. The finger scan sensor may be installed in the display 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (e.g., an earphone, an external speaker, or the like), a port for near field communication (e.g., an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained.

The flash 124 may be disposed adjacent to the second camera 121*b*. When an image of a subject is captured with the camera 121*b*, the flash 124 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication.

At least one antenna for wireless communication may be disposed on the terminal body. The antenna may be embedded in the terminal body or formed in the case. For example, an antenna that configures a part of the broadcast receiving module 111 (see FIG. 1A) may be retractable into the terminal body. Alternatively, an antenna may be formed in the form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

Meanwhile, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display 151 to extend the function of the mobile terminal 100. Another example of the accessory may be a touch pen for assisting or extending a touch input onto a touch screen.

The mobile terminal 100 according to embodiments disclosed herein includes the camera 121 for capturing an image. When a camera application is executed, a preview image for photographing is displayed on the display 151. Then, when camera operation is entered into a subject (or object) recognition mode, objects included in the preview image are analyzed to automatically recognize or identify a subject to be captured, and an optimal camera effect suitable for the recognized subject may be automatically applied to the preview image.

Accordingly, an optimal scene may be obtained without having to adjust camera setting values, such as a color, brightness, an EV value, contrast, a filter, and the like, most suitable for the subject to be photographed.

Further, in the present disclosure, a list of camera effects that are additionally applicable to the recognized subject are provided based on a touch input applied to the preview image even after an optimal camera effect is applied to the recognized subject. Thus, an additional filter and the like may also be easily and quickly applied according to user selection.

A "subject recognition mode" disclosed herein refers to an operation mode designed to automatically adjust or apply settings to obtain an optimal image result without having to adjust a camera filter or an EV value by a user suitable to a situation (or condition) when camera shooting.

Or, the subject recognition mode may refer to an operation mode designed to apply camera settings optimized for a subject, or a capturing (or shooting) condition by automatically changing, updating, and learning them, so as to obtain an optimal image result when camera shooting.

Alternatively, the subject recognition mode may be an operation mode designed to apply a color tone or image quality that captures or represents characteristics of a main (target or central) subject by identifying the main subject among a plurality of objects or elements included in a preview image. For example, if a main subject is food, a color tone or image quality that makes the food look more delicious may be applied, and if a main subject is a sky, a color tone or image quality that makes the sky look more vivid and higher may be applied.

In addition, a "camera effect" described herein includes not only a color tone of an image, an image quality, a filter, an EV value, contrast, and optics, but also composition of camera shots.

Further, a "subject to be photographed or captured" used herein may refer to a specific person (or a plurality of persons), a specific object (or a plurality of objects), and/or an entire scene. That is, it may include a background, or may not include the background.

Hereinafter, operations in the subject recognition mode according to the present disclosure will be described in more detail with reference to FIGS. 2A, 2B, 2C, 2D, and 2E.

Figure 2A:
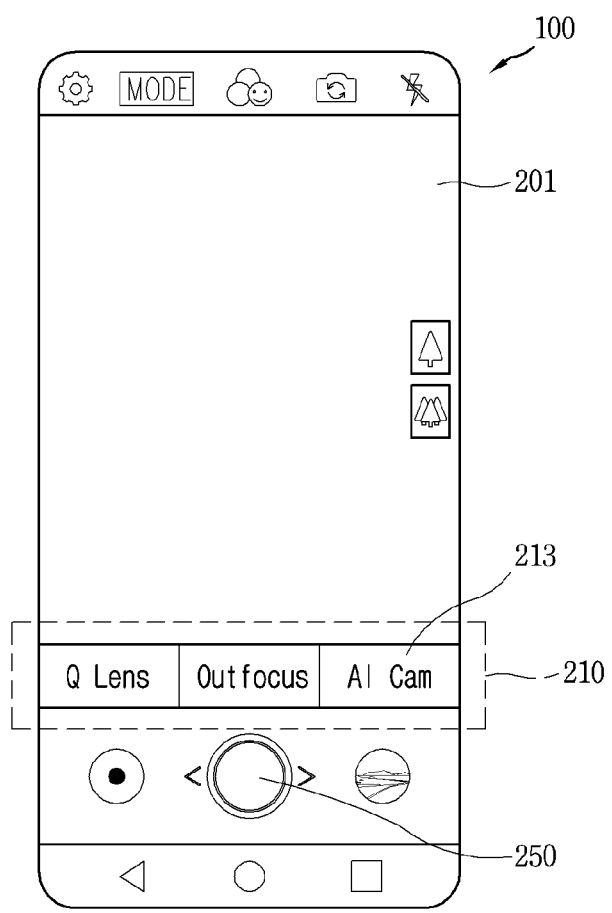
FIGS. 2A, 2B, 2C, 2D, and 2E are conceptual diagrams for explaining specific operations according to execution of a subject recognition mode in a mobile terminal according to the present disclosure.

First, FIG. 2A illustrates a preview image displayed in response to execution of a camera application in the mobile terminal 100 according to the present disclosure. Home touch buttons, including a 'back' icon, are provided in a bar at the bottom of the display 151. In addition, most (or frequently) used camera setting menus are displayed in a bar at the top of the display 151. In order to secure a fingering distance (or fingers moving distance), a function (or feature) icon 213 used for entering a subject recognition mode according to the present disclosure may be included in a USP menu bar 210 located above a shutter button 250, namely, below a preview image 201. However, this is one example, and the USP menu bar 210 may also be disposed at a side surface, or the top of the display 151.

Figure 2B:
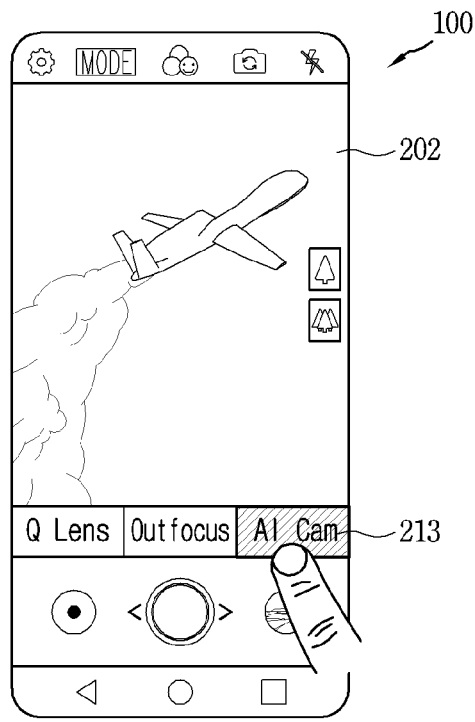

Referring to FIG. 2B, the subject recognition mode may be entered immediately when a user touches the function icon 213, namely, an 'AI Cam' button while an aircraft in the background of the sky is displayed on the display 151 as an image to be captured, i.e., a preview image 202. In some implementations, a predetermined voice command, a hard key, or the like may be used to enter the mode.

When the subject recognition mode is entered, the controller 180 runs a plurality of image analysis programs embedded in the main body to analyze an image in the preview image 202. In addition, a tag cloud is provided according to the image analysis.

Here, the tag cloud refers to all tags (linked keywords) highlighted and visualized at positions (or locations) where popular or important tags can be easily seen. In addition, each tag in the tag cloud is not limited to a name of an object. For example, a sentence (or phrase) that expresses a color such as 'blue', or a keyword of emotion (feelings) such as 'depressed' may be included. In the present disclosure, 'tag cloud' and 'tag' are similar in meaning and may be used interchangeably.

Figure 2C:
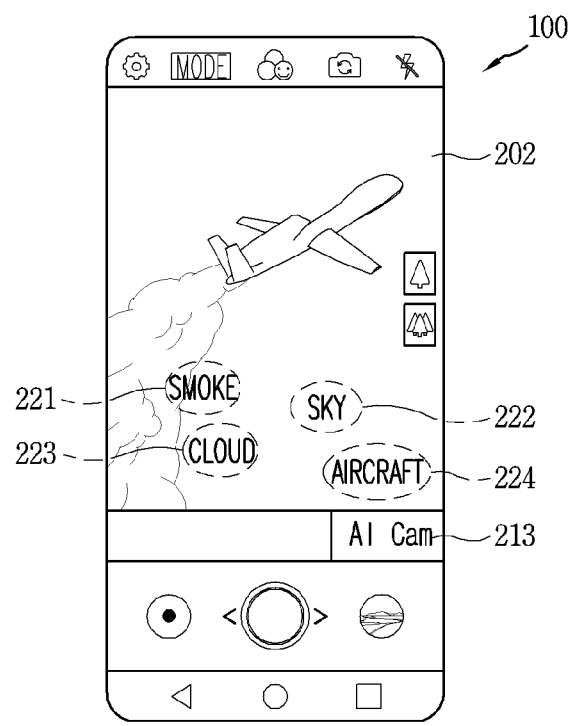

Referring to FIG. 2C, when a scene in the preview image 202, namely, the scene of an air show with aircraft preforming air demonstrations is analyzed, keywords, such as 'sky', 'aircraft', 'cloud', and 'smoke', are generated based on objects in the preview image 202. This tag cloud allows the scene to be recognized. Here, tags 221, 222, 223, and 224 corresponding to the analyzed objects are displayed in the preview image 202 and disappear after a specific time has elapsed.

In one example, when tags are output, an animation effect may be applied to make the tags appear sequentially on the preview image 202 in the recognized order, and then gradually fade and disappear sequentially or simultaneously. In addition, the tags 221, 222, 223, and 224 may be output to a specific area in the preview image, for example, a bottom area, or may be output to positions adjacent to the recognized objects. This tag output not only allows a user to check a subject for photographing identified by the main body, but also increases user's interest. Further, the tags may be used as criteria for sorting, storing, and retrieving captured images/videos, which will be described in detail hereinafter.

Figure 2D:
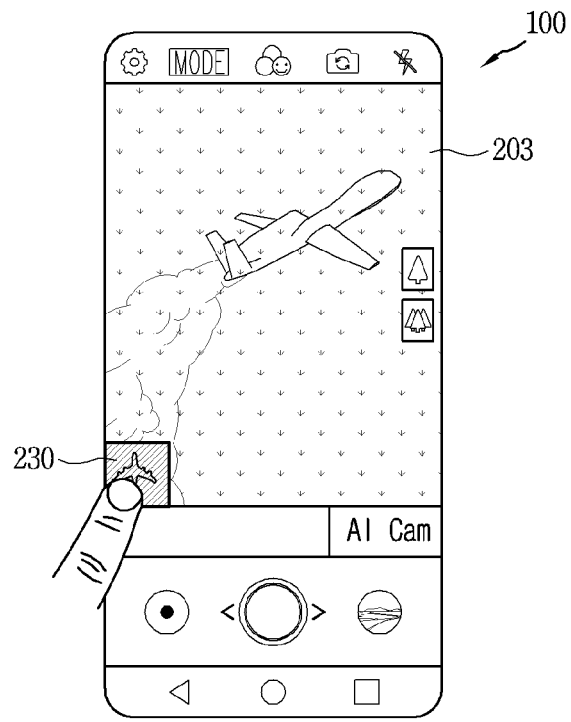

When the tags disappear or during the tag output, a camera effect tailored to a subject to be captured is applied to the preview image. Accordingly, as illustrated in FIG. 2D, the preview image is changed to a preview image 203 to which a color, image quality, filter, EV value, and the like suitable for shooting an image of the 'aircraft' are applied, for example, it is changed to an image to make the sky look more vivid and clear, and the aircraft to look sharper. That is, the optimized camera effect for the recognized scene is immediately applied.

Then, an icon 230 indicating a recognized subject, namely, 'aircraft' is output to one area of the preview image 203, for example, a bottom left corner. Accordingly, the user may check whether a subject recognized by the terminal matches a subject desired to be captured. In this state, when the shutter button is selected, the user may acquire an image result optimized for shooting the 'aircraft'.

Figure 2E:
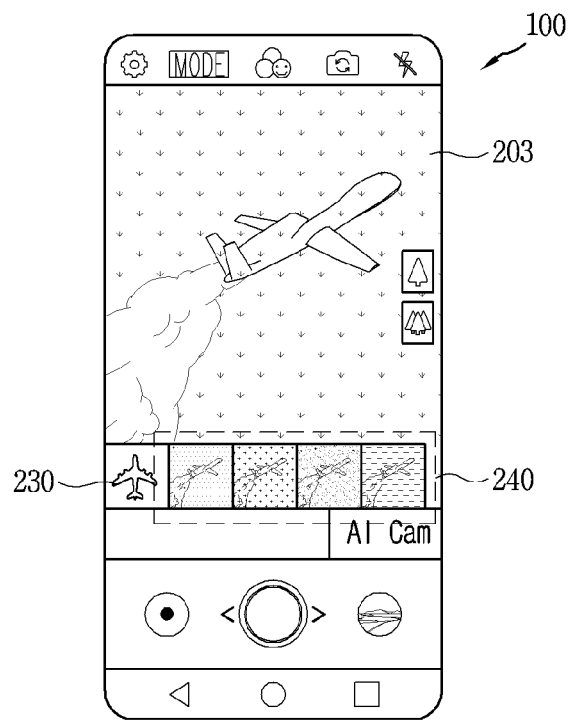

Meanwhile, as illustrated in FIG. 2D, when a touch is applied to the icon 230 indicating the recognized subject, a camera effect that may be additionally applied to the 'aircraft' to be captured, for example, a list of icons 240 including recommendable filters applicable to the 'aircraft' to be captured is further provided, as illustrated in FIG. 2E. Here, content and sequence of the list of icons 240 may vary depending on a subject recognized.

In the list of icons 240 of FIG. 2E, a text indicating a filter to be applied may be output to each icon. Alternatively, a text indicating a corresponding filter may be displayed when a proximity touch is applied to a specific icon.

In one implementation, the list of icons 240 may disappear from the screen when a touch input is additionally applied to the icon 230 indicating the recognized subject, or a preset or predetermined time has elapsed.

When a specific icon is selected from the list of icons 240, a filter value corresponding to the selected specific icon may be additionally applied to the current preview image 203. As another example, a filter value corresponding to a specific icon selected by replacing the camera effect applied to the current preview image 203 may be applied.

Meanwhile, although not illustrated, when the function icon 213 is touched again, the subject recognition mode may be disabled, and the user may capture an image without optimal camera effect application.

As such, in the present disclosure, even a user unfamiliar with detailed settings provided by the camera application may easily obtain an image optimized for a subject to be captured or recorded. Further, an applicable camera effect may be additionally used, or a camera effect applied to the subject to be photographed may be changed to another camera effect, thereby satisfying both user convenience in acquiring an optimal image and a personal preference for photographing.

Hereinafter, specific operations in the subject recognition mode according to the present disclosure will be described in detail with reference to FIG. 3.

Figure 3:
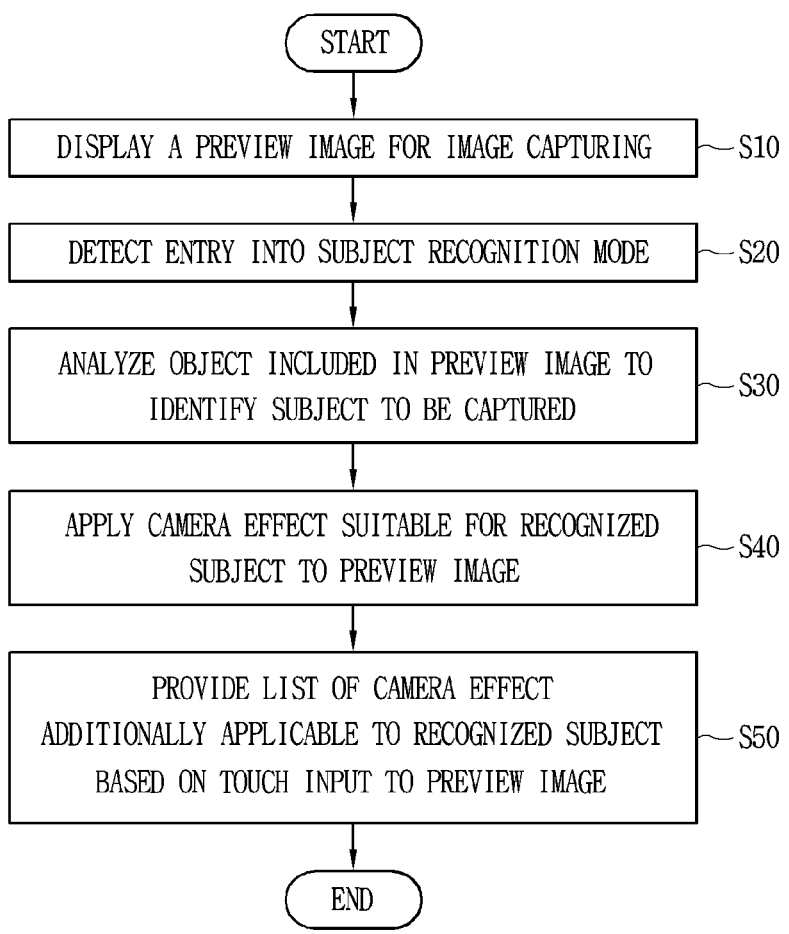
FIG. 3 is a flowchart illustrating a specific operation implemented in a mobile terminal according to the present disclosure.

Referring to FIG. 3, when a camera application is executed, a preview image for image capturing is displayed on the display 151 (S10).

While the preview image is displayed, the controller 180 of the mobile terminal 100 may detect entry into a subject recognition mode (S20). Here, the entry into the subject recognition mode may be enabled, for example, by selecting a default icon provided at the bottom of the preview image.

Meanwhile, when a shutter button is selected without entering the subject recognition mode, steps described below are not performed, and an image is captured and stored as the currently displayed preview image. The subject recognition mode is provided as optional, thereby allowing a user to give an opportunity to make a choice, and reducing or minimizing memory and load burden due to using the subject recognition mode at all times.

When the subject recognition mode is entered, objects included in the preview image is analyzed to generate a tag cloud. A scene or subject to be captured by the user is recognized by this tag cloud (S30).

When the subject to be captured is identified, a camera effect suitable for the recognized scene or subject is immediately applied to the current preview image (S40). To this end, the memory of the mobile terminal 100 includes matched (or matching) information, such as types of subjects recognized through the tag cloud, camera effects optimized for the respective subjects, more specifically, a color, an image quality, a contrast ratio, an EV value, contrast, and an illuminance value, and the like, may be stored in a table form.

Meanwhile, after the matched camera effect is applied, when a touch input is additionally applied to the preview image, a list of camera effects additionally applicable to the recognized subject is further provided (S50). Or, other camera effects applicable to the recognized subject may be recommended.

In one implementation, when a scene or subject to be captured is recognized, a graphic object/icon representing the recognized scene or subject is output in the preview image. Then, a list of camera effects that may be additionally applied to the recognized subject may be output based on the touch applied to the graphic object/icon. The displayed list may disappear from the screen when a touch input is additionally applied to the graphic object/icon, or a predetermined time has elapsed.

Hereinafter, specific examples related to various camera effects to be applied to the recognized subject will be described in more detail with reference to FIGS. 4, 5A, 5B, 6A, 6B, and 6C.

Figure 4:
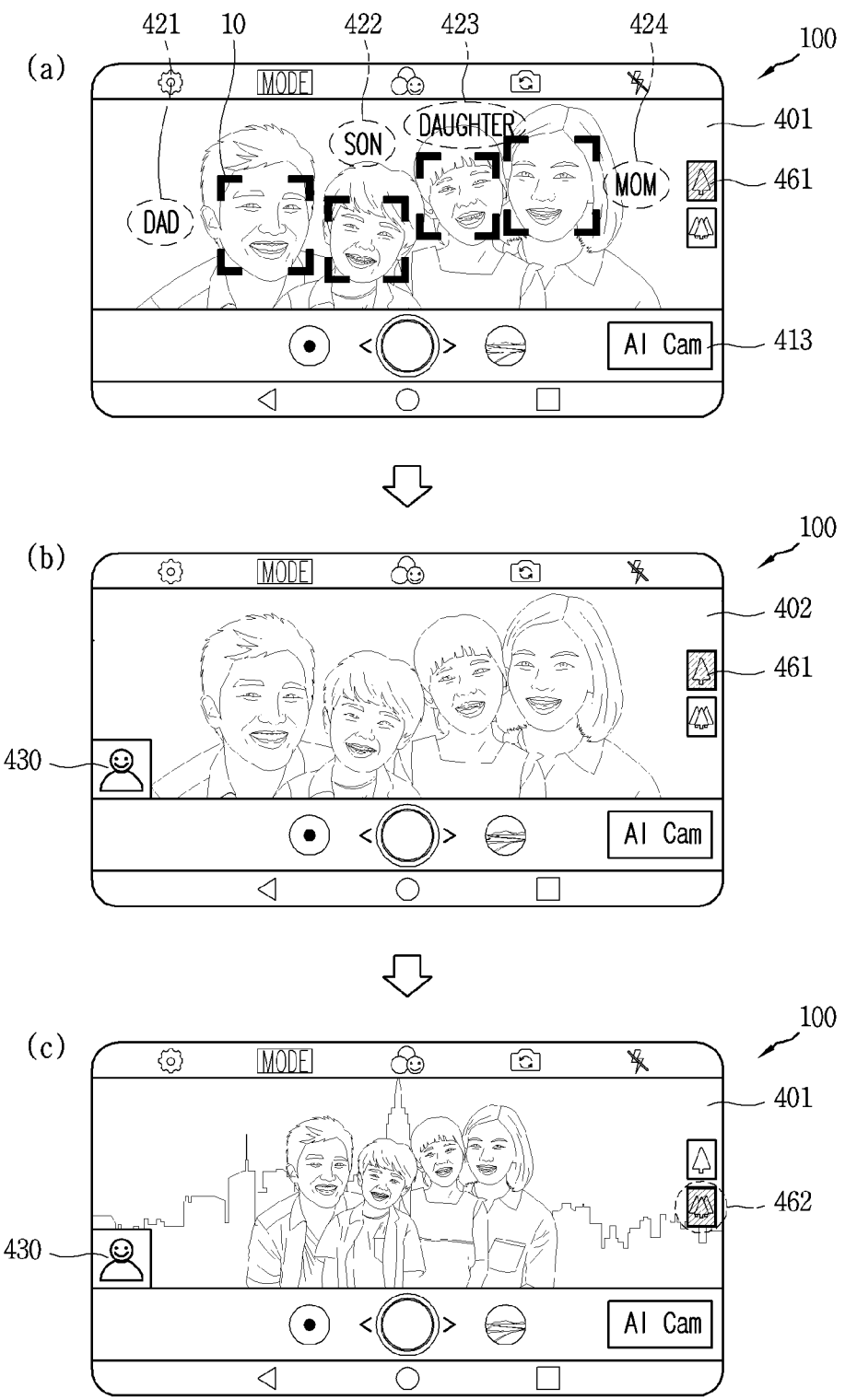
FIGS. 4, 5A, 5B, 6A, 6B, and 6C are conceptual diagrams illustrating specific examples related to various camera effects to be applied to a recognized subject in a mobile terminal according to the present disclosure.

First, FIG. 4 illustrates an example of generating a tag cloud based on information stored in the mobile terminal 100 and switching a shooting mode to a wide-angle mode according to positions and the number persons to be captured.

As illustrated in (a) of FIG. 4, when the subject recognition mode is entered using a menu icon 413 before camera shooting, people included in a preview image 401 are recognized. Then, faces in a focus box 10 are identified through a face recognition program, which is one of image analysis programs, and names stored in an address book, a social networking service (SNS), and the like of the mobile terminal 100 may be generated as tag clouds. Accordingly, stored name-based tag clouds 421, 422, 423, and 424 are output in the preview image 401. Until this time, a normal mode without using a wide angle may be maintained.

As illustrated in (a) of FIG. 4, each of the tag clouds 421, 422, 423, and 424 may be output to a location corresponding to each person, namely, near the face of each person, and then may disappear. However, in another example, it may be output to a specific location, or in a predetermined pattern and then disappear regardless of locations of the recognized objects.

Next, referring to (b) of FIG. 4, as a plurality of persons is recognized as a subject to be captured, a person icon 430 is displayed, and the preview image 401 is changed to a preview image 402 to which a color, a filter, an image quality, an EV value, contrast, and the like suitable for a group photo are automatically applied.

Here, when many people exist in a scene to be photographed, and it is determined that some faces of the persons are located at edges, the general mode is automatically switched to the wide-angle mode for obtaining an optimal image, as illustrated in (c) of FIG. 4. Accordingly, a wide-angle mode icon 462 is activated. As a camera effect suitable for a subject to be captured is applied and the mode is automatically switched to the wide-angle mode according to arrangement/composition of the subjects, the user may acquire an optimal image tailored for a situation without manipulation.

Meanwhile, the automatically switched wide-angle mode may be easily disabled by touching the wide-angle mode icon 462, or a general mode icon 461.

Figure 5A:
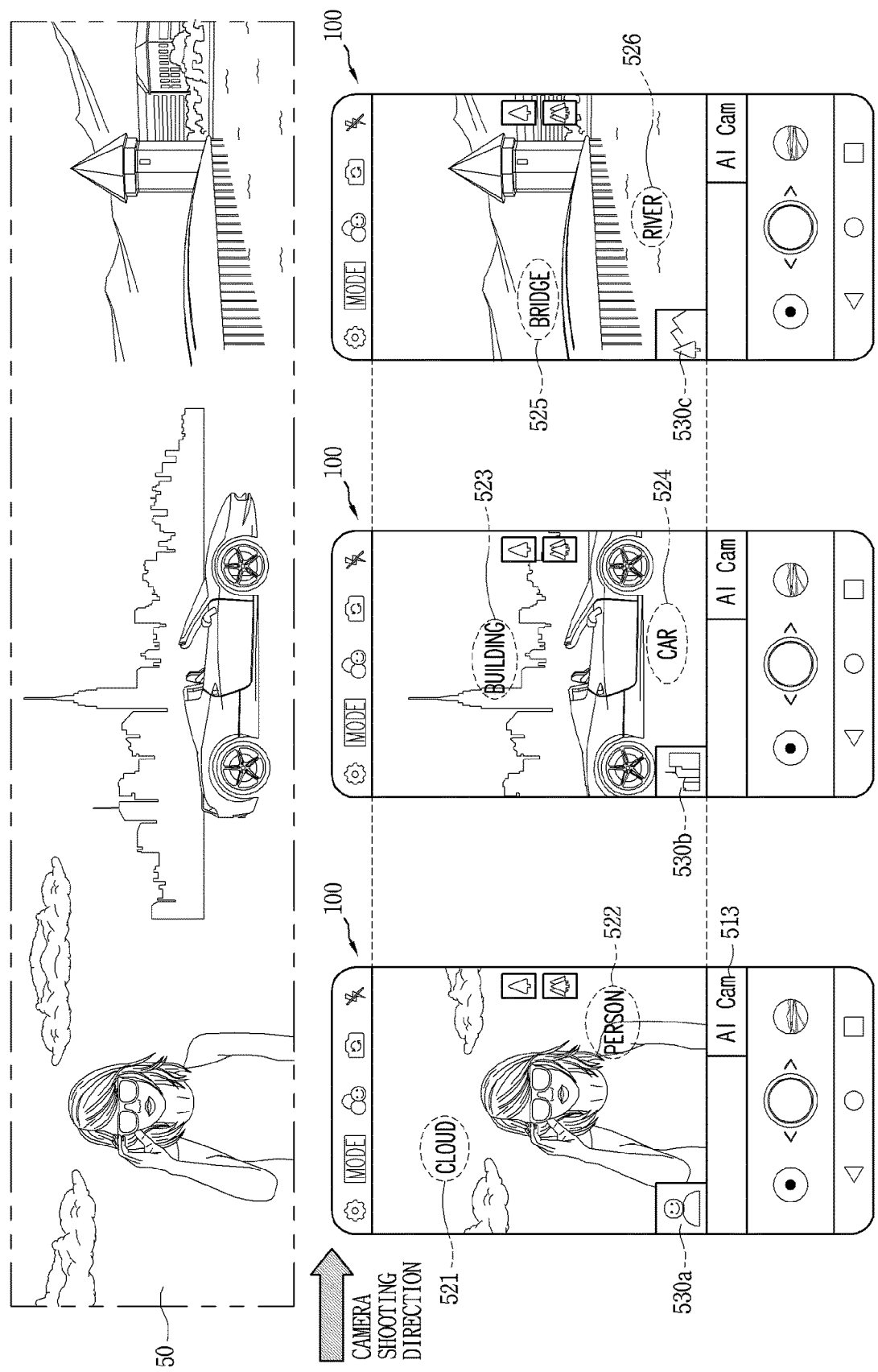

Next, FIG. 5A illustrates a process of operation when a preview image is changed in the subject recognition mode. When an object in a preview image is changed, or the preview image itself is changed, namely, when a scene is changed, a graphic object/icon indicating a recognized subject are changed in real time so as to correspond to a subject newly or differently recognized.

More specifically, in FIG. 5A, when shooting a real environment (or surrounding) 50 in a single image/continuous image/panorama shooting mode in one direction, a scene changed according to movement of the main body is displayed in a preview image of the display 151. Then, different tag clouds, namely, first tag clouds 521 and 522, and second tag clouds 523 and 524, and third tag clouds 525 and 526 may be sequentially output. In addition, as the recognized subject changes, different subject icons 530a, 530b, and 530c are sequentially output.

To this end, a plurality of subjects and camera effects matched to the respective subjects may be stored in the memory 170 of the mobile terminal 100 in a table form. In addition, the controller 180 specifies one of the plurality of recognizable subjects stored in the memory 170 based on the tag clouds obtained by analyzing the objects included in the preview image, and quickly applies a matched camera effect by calling up the matched effect(s) tailored for the subject.

Meanwhile, when a scene is changed before all of the tag clouds are output, only a part of the generated tag clouds may be output. To this end, the controller 180 may stop output of tag clouds of the previous scene.

Figure 5B:
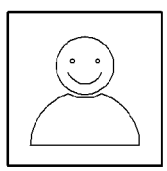
Figure 5B:
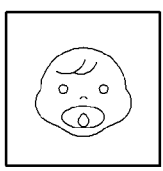
Figure 5B:
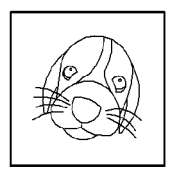
Figure 5B:
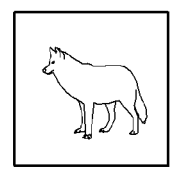
Figure 5B:
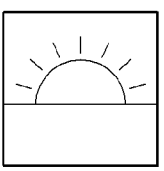
Figure 5B:
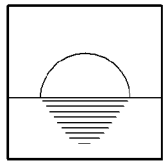
Figure 5B:
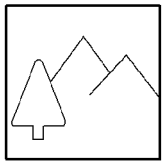
Figure 5B:
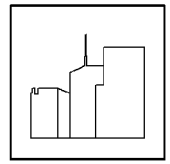
Figure 5B:
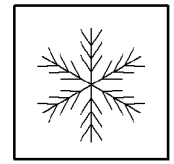
Figure 5B:
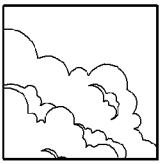
Figure 5B:
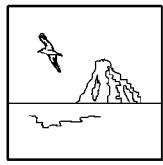
Figure 5B:
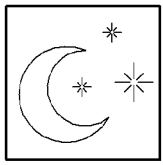
Figure 5B:
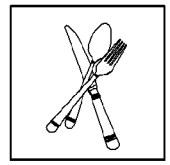
Figure 5B:
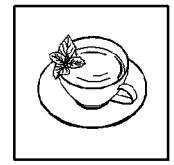
Figure 5B:
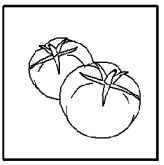
Figure 5B:
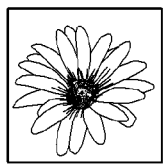
Figure 5B:
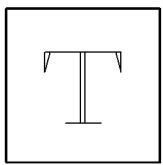
Figure 5B:
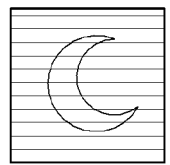
Figure 5B:
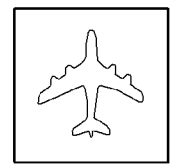

FIG. 5B illustrates examples of graphic objects/icons indicating the recognized subject as described above. In detail, (a) Person, (b) Baby, (c) Pet/Companion animal, (d) Animal, (e) Sunrise, (f) Sunset, (g) Landscape, (h) City, (i) Snow, (j) Sky, (k) Beach, (l) Night sky, (m) Food, (n) Beverage, (o) Fruit, (p) Flower, (q) Text, (r) Low-light level, and (s) Airplane are illustrated as the examples. For instance, in order to identify a subject, even a person may be categorized into (a) Person or (b) Baby through image analysis based on, such as whether the person has a big head circumference, a low nose, and chubby cheeks. In addition, a subject may be specified by categorizing into (c) Pet/Companion animal or (d) Animal through specific image analysis based on, such as proximity to a person and whether or not an animal is wearing clothes.

Meanwhile, such graphic objects/icons may be further subdivided or integrated according to updates or learning.

In the examples, there are some subjects that are difficult to distinguish through image analysis of a preview image, which will be described in detail with reference to FIGS. 9A to 9C.

Next, an example in which an automatic effect and an additional effect of the camera are applied when the subject recognition mode is activated in low-light conditions will be described in detail with reference to FIGS. 6A to 6C.

Figure 6A:
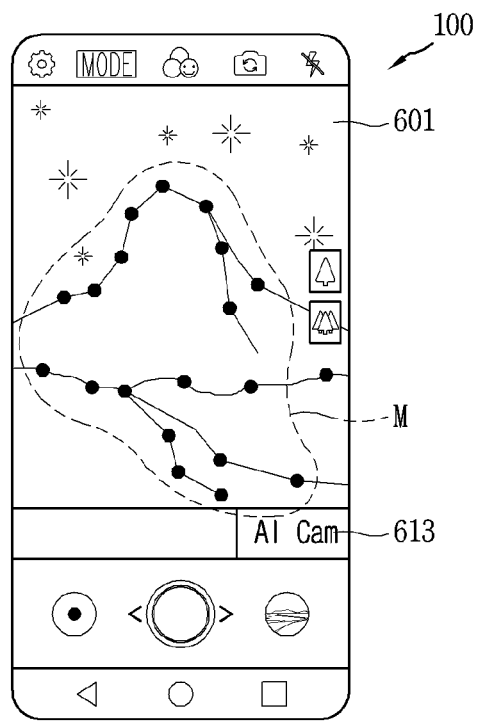

Referring to FIG. 6A, for example, when a subject recognition mode 613 is selected for capturing an image of a night sky, it is difficult to clearly identify objects in a preview image 601 through image analysis, and thus the tag clouds may not be generated or output. Instead, a point where an object is recognized is marked. As illustrated in FIG. 6A, multiple markers M appear and disappear along an outline or contour of the object recognized in low ambient light conditions.

Figure 6B:
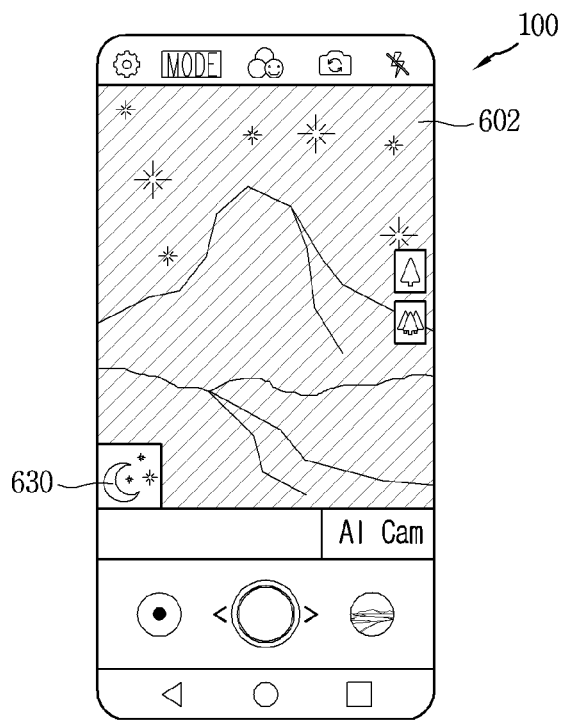

As illustrated in FIG. 6B, the preview image 601 is switched to a preview image 602 to which a filter and an optical value (increase of illumination intensity) suitable for the recognized subject of night sky are applied, then a night sky icon 630 indicating the recognized subject is displayed on the preview image 602.

Figure 6C:
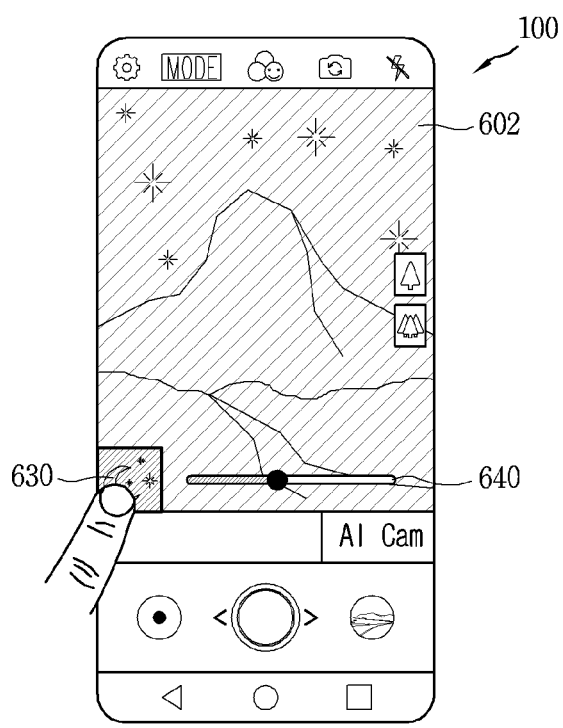

At this time, as illustrated in FIG. 6C, when a touch input is applied to the night sky icon 630, a progress bar 640 for additionally adjusting the optical value may appear. A desired optical value may be applied by dragging a moving element displayed on the progress bar 640 from left to right.

Although not shown, the controller 180 may automatically enable a bright mode under extremely low light conditions and disable the bright mode when it becomes brighter than a reference value (e.g., 10 lux or more) again.

Next, a method of storing, classifying, and retrieving captured images based on tag clouds generated in the subject recognition mode according to the present disclosure will be described in detail with reference to FIGS. 7A, 7B, and 7C.

To this end, when the camera 121 is operated in the subject recognition mode, the controller 180 controls such that captured images are sorted and stored using generated tags.

Figure 7A:
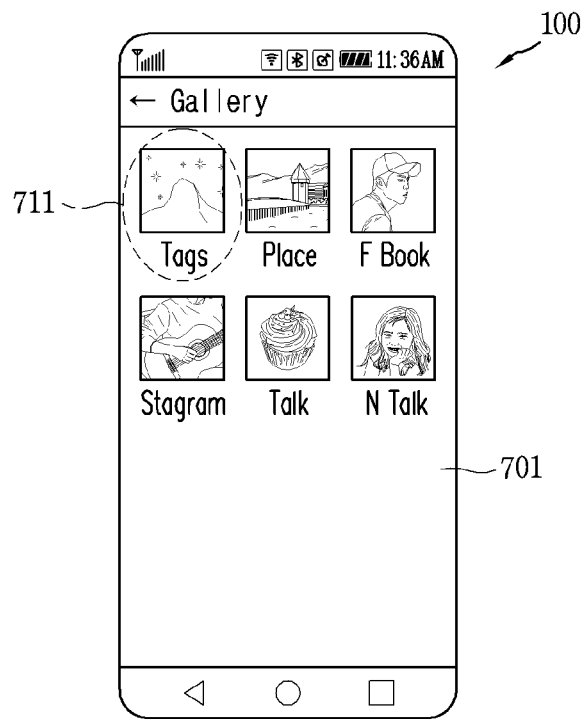
FIGS. 7A, 7B, and 7C are conceptual diagrams illustrating an example of storing, classifying, and retrieving a captured image using a tag generated based on an object in a preview image in a mobile terminal according to the present disclosure.
Figure 7B:
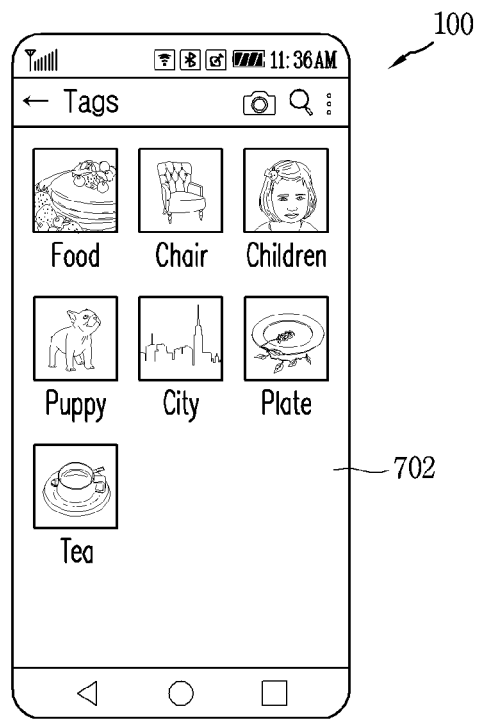

First, referring to FIG. 7A, an image captured in the subject recognition mode may be stored in a separate tag folder (Tags) 711 of a list 701 of gallery application. Here, when the tag folder 711 is selected, images captured in the subject recognition mode are classified based on matched tags and stored as sub-folders 702, as illustrated in FIG. 7B.

At this time, names of the sub-folders 702 are selected from the tag clouds, not the names of the recognized subjects. Here, for accuracy of classification, a subfolder may be specified by calculating a degree of association (or relevance) of a plurality of tags. In addition, when one image is belonged to a plurality of tag folders, a specific classification item may be determined by taking into account various factors, such as the number of relevant tags, the degree of association of the tags, a date captured, a place taken, a time captured, and a subject recognized at the time of shooting.

Figure 7C:
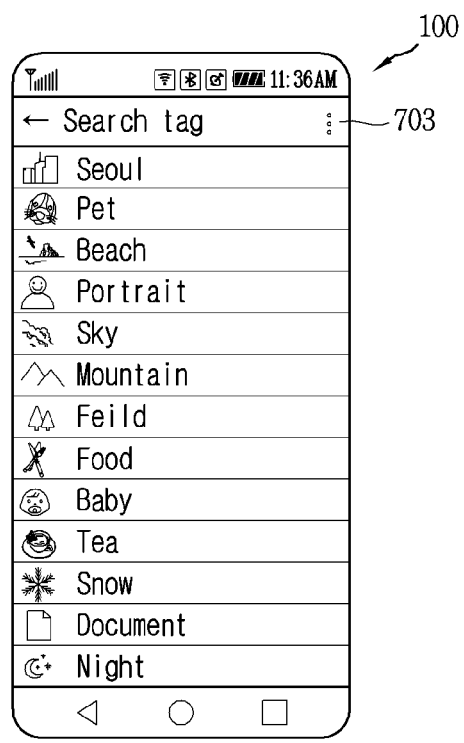

As another example, a tag cloud may be used as a classification keyword for stored images in an image search screen 703, as illustrated in FIG. 7C. Alternatively, although not shown, a specific image stored may be directly retrieved by entering a specific tag of the tag clouds. In this case, recently searched tags, namely, the history of keywords may be provided.

Further, in another example, an image including a specific tag in the tag clouds may be uploaded to a predetermined SNS bulletin board, blog, or the like through user confirmation at the time of shooting or immediately after shooting.

Figure 8:
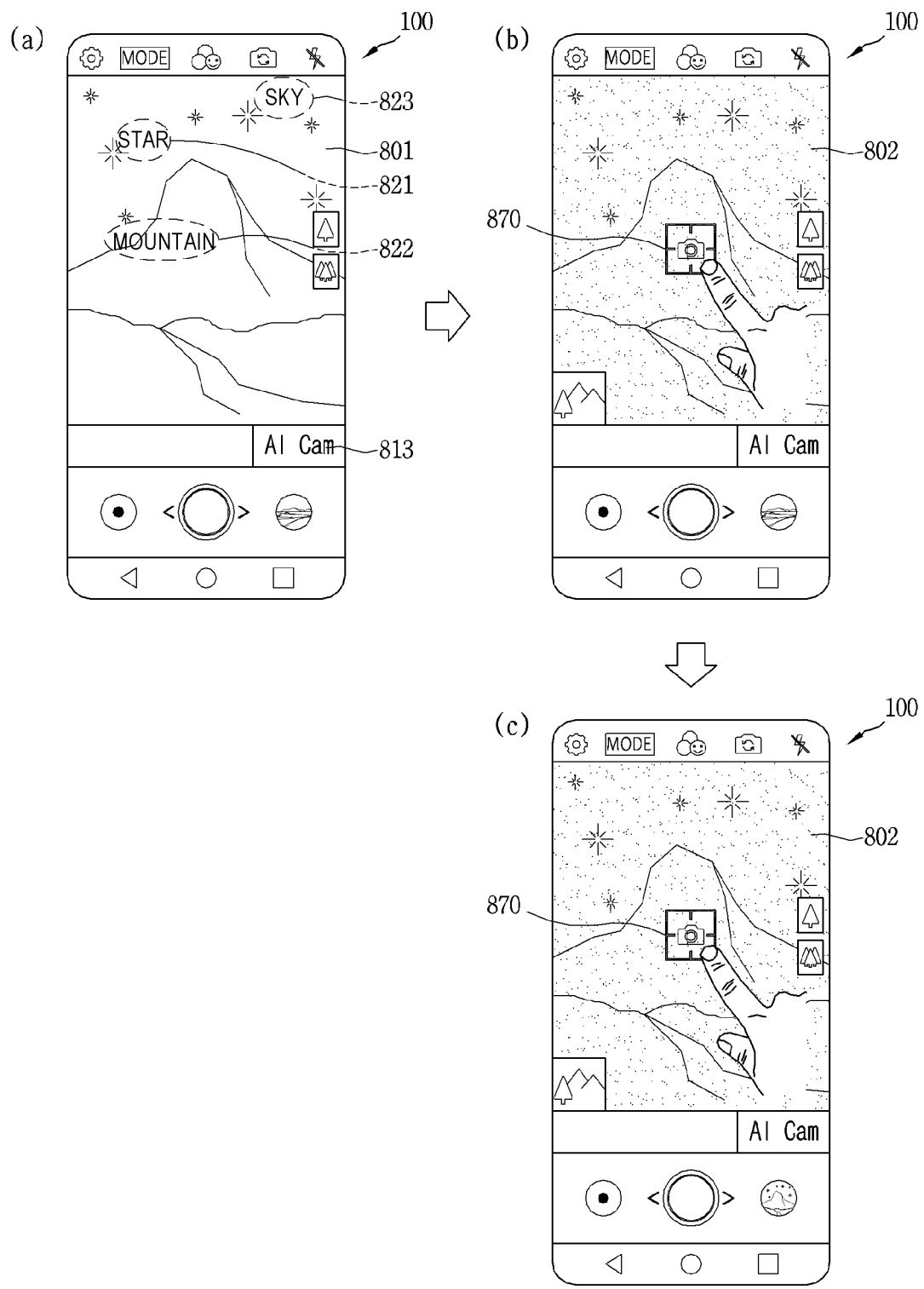
FIG. 8 is an exemplary conceptual diagram illustrating a method of quickly capturing an image using a focus image in a mobile terminal according to the present disclosure.

Next, FIG. 8 illustrates a method of quickly capturing an image using a focus image as an additional function.

In a subject recognition mode 813, tag clouds 821, 822, and 823 such as 'star', 'sky', and 'mountain' are output according to analysis of a preview image 801. Even after a subject is recognized as 'landscape' and an optimized camera effect is applied thereto, focusing on any one subject may be additionally performed.

More specifically, when a touch input is applied to 'mountain' in a changed preview image 802 as illustrated in (b) of FIG. 8, a focus box 870 is displayed at a point where the touch input is applied, and a focusing effect is additionally applied to the 'mountain'.

Here, the focus box 870 has a shutter function. Accordingly, as shown in (c) of FIG. 8, when a touch input is continuously applied to a point where the focus box 870 is output, the preview image 802 is captured. Meanwhile, when a touch is applied to another point outside the focus box 870, or a drag input is applied to the focus box 870, the focusing effect is applied to another object as the focus box 870 is moved to another location.

In other words, as an additional focusing effect is applied and the focus box 870 is used as the shutter button after applying the optimized camera effect through the focus box 870, a shutter position in a fingering area may be secured, allowing a photo to be taken without shaking.

Next, a method of specifying a main subject in the subject recognition mode will be described in detail with reference to FIGS. 9A, 9B, 9C, and 9D. When it is difficult to identify a main subject to be captured by only analyzing a preview image, for example, there is a plurality of objects and each having a similar area in the preview image, the main subject is specified using at least one of a touch input, changes in movement value (or variations) of the main body, time information, and location information.

First, FIG. 9A is an example of quickly identifying a main subject using a touch input in a subject recognition mode 913.

In FIG. 9A, for example, in case it is difficult to determine a main subject to be photographed based on a degree of association and an occupied area of tag clouds 921, 922, 923, and 924, namely, 'person', 'seagull', 'cloud', and 'sky', an object different from the main subject desired to be photographed by the user may be determined as a main subject.

When a touch input on the background of a preview image 901, for example, a touch input on the sky is detected, the controller 180 recognizes the scene by regarding the sky as a main subject. Accordingly, the preview image 901 is switched to a preview image 902 to which an optimal camera effect is applied based on the sky as the subject, and a sky icon 930, which is the recognized subject, is output to the preview image 902, as illustrated in (b) of FIG. 9A.

Next, referring to FIG. 9B, in the subject recognition mode, a main subject to be photographed is identified among objects included in a preview image by using changes in movement value of the mobile terminal 100.

To this end, when the subject recognition mode is executed, the controller 180 may sense changes in a tilt (or inclination) value of the terminal, namely, changes in a value of an x-axis, a y-axis, and a z-axis based on sensing values detected through a gyro sensor, a geomagnetic sensor, and the like of the sensing unit 140.

In the preview image 902 that includes various objects as illustrated in (a) of FIG. 9B, when a tilt value of the terminal, namely, values of the y-axis and z-axis are changed to positive values, a 'sky' is determined as a main subject to be photographed, and a sky icon 930a is output to the preview image 902.

On the other hand, when the tilt value of the mobile terminal 100 is changed as the mobile terminal 100 is adjusted toward the front from the state of (a) of FIG. 9B or (b) of FIG. 9B, a 'person' seen from the front is determined as a main subject to be photographed. Accordingly, a 'person' icon 930b recognized as the main subject is output, and a camera effect suitable for the 'person' is applied immediately.

Further, when the tilt value of the terminal in (a), (b), or (c) of FIG. 9B is changed only in the x-axis, for example, it is determined that a photo of a moving object, namely, a 'seagull' is to be taken, and a camera effect suitable for an 'animal' is immediately applied. Then, an 'animal' icon 930c is output to the preview image 902, so as to allow the user to recognize (or check) this.

Although not illustrated, the corresponding function may be turned off to prevent a main subject from being changed according to tilting of the terminal.

Next, in FIG. 9C and FIG. 9D, any one of camera effects is selectively applied based on at least one of time information and location information when different camera effects matching a recognized subject exist in the subject recognition mode.

First, referring to FIG. 9C, a sunrise and a sunset are respectively taken in the same place. It is hard to tell the difference between a sunrise and a sunset by just analyzing the image. In this case, the current time may be useful to easily determine whether it is a sunrise or sunset.

Referring to FIG. 9C, in the 'morning' time, a scene is determined as a sunrise, and a color, a filter, an EV value, contrast, and the like are automatically applied to create a photo of vibrant rising sun. In the evening' time, a scene is determined as a sunset, and a color, a filter, an EV value, contrast, and the like are automatically applied to create a warm feeling of the sun setting down. Here, different icons 930d and 930e are displayed on the respective scenes, and the scenes may be stored in different folders after being captured.

Next, FIG. 9D illustrates an example in which a main subject is selected differently when objects included in the preview image are the same or similar but backgrounds are completely different. In FIG. 9D, as for a 'familiar place' such as home, the background may be excluded from a subject and a 'person' may be selected as a main subject. However, in the case of an 'unfamiliar place' such as a beach, even though there are a person and a pet, a 'landscape' may be selected as a main subject.

Accordingly, a preview image 904 to which a camera effect suitable for a 'person' 930f is applied is displayed on the left side of FIG. 9D, and another preview image 905 to which a camera effect tailored to a 'landscape' 930g is applied is displayed on the right side of FIG. 9D.

As another example, FIG. 10 illustrates an exemplary method of operation in a subject recognition mode when a recognized subject is a document including a text.

As illustrated in FIG. 10, when an actual document 20 is photographed, or an image of mostly texts such as web news is recording/capturing, a camera effect for enhancing legibility and/or readability may be automatically applied without user manipulation.

Here, the camera effect may include camera effects for not only increasing legibility of text-type content, but also improving readability of a whole text.

In FIG. 10, when a subject recognition mode 1013 is executed, texts in a preview image 1001 are changed to a preview image 1002 with better legibility than an original document 20 as a camera effect is applied thereto. At this time, a 'T' icon 1030 of text is output in the preview image 1002. That is, the controller 180 adjusts a contrast ratio between the background and text according to an analyzed text attribute and applies it to the preview image.

Here, camera effects that improve legibility and/or readability may include, for example, changing a font size, minimizing the number of document font families, use of the same font size, changing a text color opposite to a background color, changing a red or green text to different colors, and adjusting a contrast ratio between a body text and an image text.

For example, a small (or normal) text should have at least a 4.5:1 contrast ratio with text and its background, and a large text (e.g., 18 pt) should have at least a 3:1 contrast ratio with text and its background.

Figure 11:
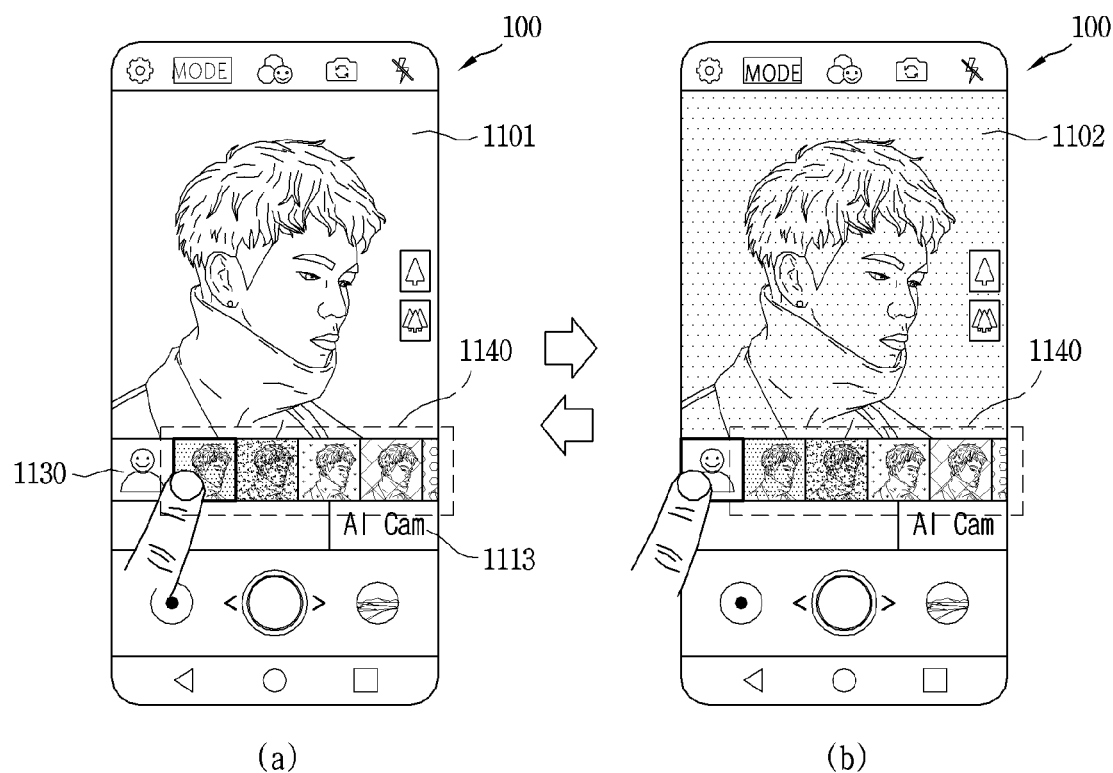
FIGS. 11, 12, and 13 are exemplary diagrams for explaining different camera effects applicable to a subject to be photographed in a mobile terminal according to the present disclosure.
Figure 12:
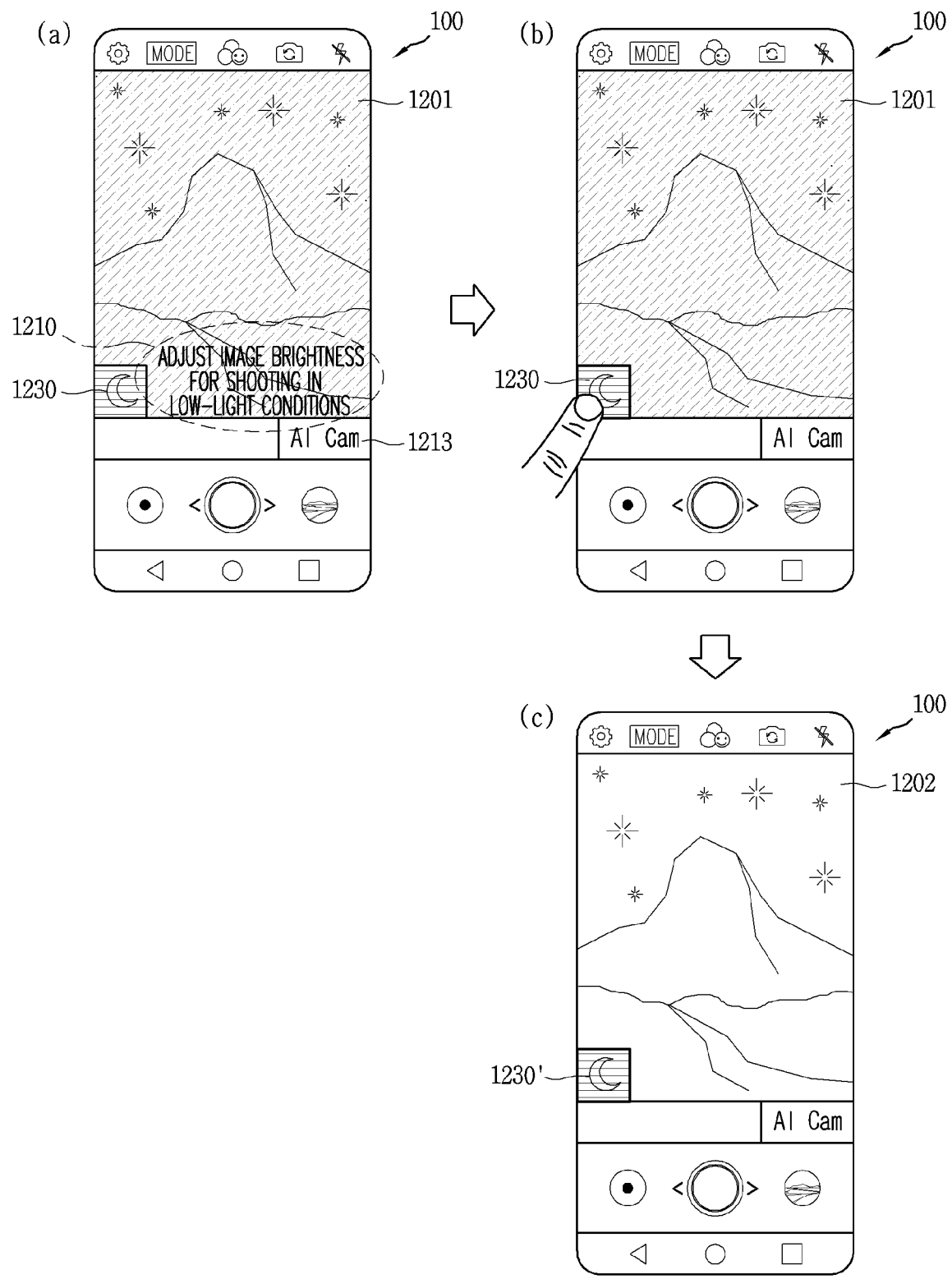
Figure 13:
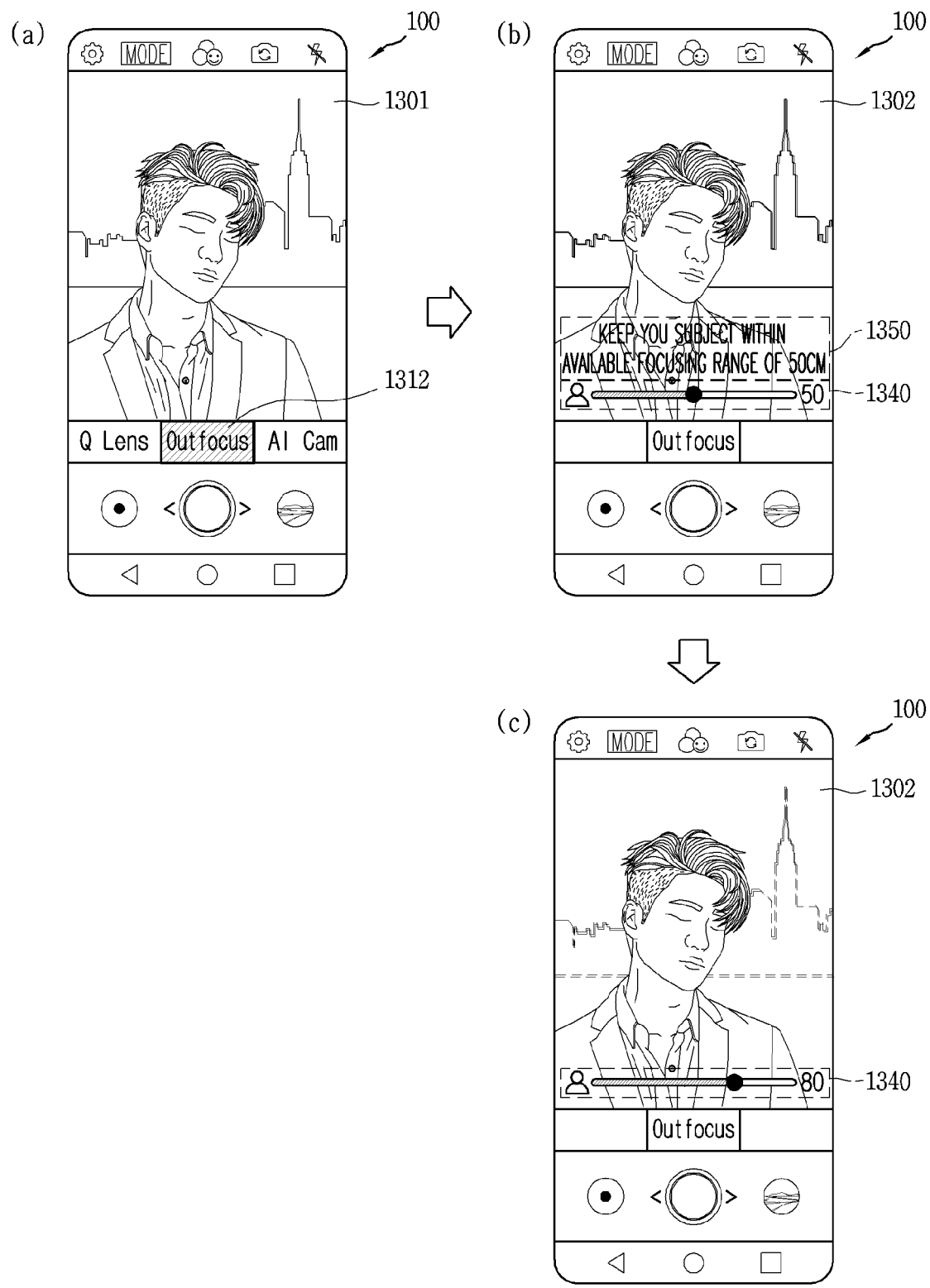

FIGS. 11, 12, and 13 are different exemplary views for explaining other camera effects additionally applicable to a subject to be photographed in the mobile terminal according to the present disclosure.

First, referring to FIG. 11, a list 1140 of camera effects that may be additionally and/or alternatively applied by selecting a recognized subject icon 1130 after applying a camera effect suitable for the recognized object in a subject recognition mode 1113.

A plurality of icons to which different filters are applied to the same image as a preview image 1101 is output to the list 1140. When a specific filter icon 1114 desired to be applied is selected from the displayed list 1140, the preview image 1101 is switched to a preview image 1102 corresponding to the selected specific filter icon 1114. Here, when the subject icon 1130 is touched again, it may be switched back to the preview image 1101 prior to applying the filter.

Next, referring to FIG. 12, in a subject recognition mode 1213, when shooting in extremely low-light conditions, a maximum optical value of brightness may be quickly applied to a preview image 1201 by touching a night sky icon 1230 according to a guide message 1210 displayed on the screen. Then, a subject icon 1230', which is a changed image, may be output to a preview image 1202 to which the maximum optical value of brightness is applied.

FIG. 13 is an example of applying an out-focusing (or out-of-focus) effect based on an object when camera shooting. As illustrated in FIG. 13, when an 'Out focus' icon 1312 is selected from a default menu that is provided together with a preview image 1301, a message 1350 for guiding a focal length from a subject is output, and a control bar 1340 for adjusting the out-of-focus level is displayed.

The out-of-focus level/intensity are adjusted based on a drag input applied to the control bar 1340. In detail, when drag-and-drop is applied to the control bar 1340, a preview image 1302 to which an out-of-focus effect (e.g., blur) is applied to an area except a main subject, namely, a "person" recognized by analyzing the preview image 1301.

According to at least one of the embodiments of the present disclosure, a user may check a result of an optimal image before shooting and obtain an optimal image result without having to adjust a camera function and a shooting mode suitable for a subject to be photographed and a shooting condition. In addition, even when a plurality objects is included in a scene to be captured, an optimal camera effect may be quickly applied by accurately identifying a main subject to be photographed by taking into account various aspects, such as changes in movement value of a main body, the current time, a current location, and user selection, and the like. Further, even after a shooting mode optimized for the subject is applied, another camera effect desired by the user can be quickly added or alternatively (or newly) applied. Furthermore, as a subject or scene to be captured is identified based on a tag cloud according to preview image analysis, and images captured are automatically classified and stored based on the tag cloud, the stored images can be easily and quickly retrieved using a tag.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

The invention claimed is:

1. A mobile terminal comprising:
a camera provided in a main body;
a display configured to display a preview image to be captured by the camera when a camera application is executed; and
a controller configured to:
in a preview state:
detect entry into a subject recognition mode, in response to a touch input applied to an icon while the preview image is displayed;
analyze the preview image in response to the subject recognition mode;
generate and display a tag cloud comprising a plurality of tags on the preview image, based on the analysis, wherein each tag in the tag cloud corresponds to a respective object of a plurality of objects included in the preview image and appears in a text form comprising a name of the object, a color, and a keyword of emotion, wherein the tags appear sequentially at positions adjacent to the objects in a recognized order on the preview image, and then gradually fade and disappear sequentially or simultaneously;

recognize a subject to be photographed by analyzing the objects included in the preview image, based on the analysis;

apply a camera effect suitable for the recognized subject to the preview image; and display, on the display, a changed preview image according to the applying of the camera effect, wherein when a shutter button is selected, the changed preview image is captured and stored into a memory, and wherein when a consecutive touch input is applied to the icon, the subject recognition mode is disabled and the preview image is displayed instead of the changed preview image.

2. The mobile terminal of claim 1, wherein a graphic object indicating the recognized subject is output to the preview image when the subject to be photographed is recognized.

3. The mobile terminal of claim 2, wherein the controller, while the camera effect is applied to the preview image, is further configured to provide the display with a list of camera effects additionally applicable to the recognized subject based on a touch input applied to the preview image, and wherein the list disappears when a second touch input is applied to the graphic object, or a preset time has elapsed.

4. The mobile terminal of claim 2, wherein, when one of the objects included in the preview image is changed or the preview image is changed, an image of the graphic object is changed in real time to correspond to a changed subject.

5. The mobile terminal of claim 1, wherein the subject to be photographed is recognized by using the generated tag cloud.

6. The mobile terminal of claim 1, wherein the controller, when a plurality of persons is recognized in the subject recognition mode and at least a part of a face of one of the plurality of persons is determined to be located at an edge of the display, is further configured to perform control such that a mode is switched to a wide-angle mode after applying the camera effect.

7. The mobile terminal of claim 1, further comprising a memory configured to store a plurality of recognizable subjects and camera effects respectively suitable for the recognizable subjects in a table form, wherein the controller, in the subject recognition mode, is further configured to specify one of the plurality of recognizable subjects stored in the memory by analyzing the objects included in the preview image, so as to apply a matching one of the camera effects in a calling manner.

8. The mobile terminal of claim 5, wherein the controller is further configured to perform control such that captured images are classified and stored using the generated tag when the camera is operated in the subject recognition mode.

9. The mobile terminal of claim 1, wherein the controller, in the subject recognition mode, is further configured to output a focus image corresponding to a particular object based on a touch input to the particular object in the preview image, and control the camera to capture a corresponding preview image based on a touch input continuously applied to the output focus image.

10. The mobile terminal of claim 1, further comprising a sensor configured to sense changes in a movement value of the main body, wherein the controller is further configured to specify a main subject to be photographed among the objects included in the preview image by using the sensed changes in the movement value of the main body.

11. The mobile terminal of claim 1, wherein the controller, when different camera effects suitable for the recognized subject exist in the subject recognition mode, is further configured to selectively apply one of the different camera effects using at least one of time information or location information.

12. The mobile terminal of claim 1, wherein the controller, when the recognized subject is determined as a document including text, is further configured to adjust a contrast ratio between the text and a background according to an analyzed text attribute so as to be reflected in the preview image.

13. A method for controlling a mobile terminal, the method comprising:

displaying a preview image to be captured by a camera when a camera application is executed; and in a preview state:

detecting entry into a subject recognition mode, in response to a touch input applied to an icon while the preview image is displayed;

analyzing the preview image in response to the subject recognition mode;

generating and displaying a tag cloud comprising a plurality of tags on the preview image, based on the analysis, wherein each tag in the tag cloud corresponds to a respective object of a plurality of objects included in the preview image and appears in a text form comprising a name of the object, a color, or a keyword of emotion, wherein the tags appear sequentially at positions adjacent to the objects in a recognized order on the preview image, and then gradually fade and disappear sequentially or simultaneously;

recognizing a subject to be photographed by analyzing objects included in the preview image, based on the analysis;

applying a camera effect suitable for the recognized subject to the preview image;

displaying a changed preview image according to the applying of the camera effect;

capturing and storing the changed preview image into a memory when a shutter button is selected; and disabling the subject recognition mode and displaying the preview image instead of the changed preview image when a consecutive touch input is applied to the icon.

14. The method of claim 13, further comprising:

while the camera effect is applied to the preview image, providing the display with a list of camera effects additionally applicable to the recognized subject based on a touch input to the preview image.

\* \* \* \* \*